US00RE50460E

(19) United States
(12) Reissued Patent
Seo et al.

(10) Patent Number: US RE50,460 E
(45) Date of Reissued Patent: *Jun. 17, 2025

(54) METHOD AND APPARATUS FOR TRANSMITTING RECEPTION CONFIRMATION RESPONSE OF USER EQUIPMENT IN WIRELESS COMMUNICATION SYSTEM

(71) Applicant: LG ELECTRONICS INC., Seoul (KR)

(72) Inventors: Dong Youn Seo, Seoul (KR); Min Gyu Kim, Seoul (KR); Joon Kui Ahn, Seoul (KR); Suck Chel Yang, Seoul (KR)

(73) Assignee: LG ELECTRONICS INC., Seoul (KR)

( * ) Notice: This patent is subject to a terminal disclaimer.

(21) Appl. No.: 18/090,995

(22) Filed: Dec. 29, 2022

Related U.S. Patent Documents

Reissue of:
(64) Patent No.: 10,383,158
Issued: Aug. 13, 2019
Appl. No.: 15/934,607
Filed: Mar. 23, 2018

U.S. Applications:
(63) Continuation of application No. 17/072,554, filed on Oct. 16, 2020, now Pat. No. Re. 49,380, which is an
(Continued)

(51) Int. Cl.
*H04L 1/18* (2023.01)
*H04L 1/1607* (2023.01)
(Continued)

(52) U.S. Cl.
CPC ..... *H04W 76/10* (2018.02); *H04L 1/1607* (2013.01); *H04L 1/1692* (2013.01);
(Continued)

(58) Field of Classification Search
CPC ... H04B 1/50; H04B 1/52; H04B 1/54; H04B 1/56; H04B 7/2615; H04B 7/2656;
(Continued)

(56) References Cited

U.S. PATENT DOCUMENTS 8,687,541 B2 4/2014 Lohr et al.
2009/0073904 A1 3/2009 Ranta-aho et al.
(Continued)

FOREIGN PATENT DOCUMENTS

EP 1298829 A1 4/2003
JP 2004-527979 A 9/2004
(Continued)

OTHER PUBLICATIONS

LG Electronics, "UL ACK/NACK Transmission in Carreir Aggregation", 3GPP TSG RAN WG1 #60, R1-101231, San Francisco, USA, Feb. 22-26, 2010, pp. 1-3.
(Continued)

*Primary Examiner* — Robert L Nasser
(74) *Attorney, Agent, or Firm* — Birch, Stewart, Kolasch & Birch, LLP

(57) ABSTRACT

A method for transmitting acknowledgement/negative-acknowledgement (ACK/NACK) information of a user equipment (UE) configured with two serving cells including a first serving cell and a second serving cell, the method including receiving two transport blocks (TBs) through a downlink subframe of the first serving cell, receiving one TB through a downlink subframe of the second serving cell and transmitting ACK/NACK information informing ACK/NACKs for the two TBs and the one TB through an uplink subframe of the first serving cell, wherein the ACK/NACK information informs the ACK/NACKs for the two TBs and the one TB by a combination of one resource selected from a
(Continued)

plurality of candidate resources and two bits transmitted through the one resource.

6 Claims, 23 Drawing Sheets

Related U.S. Application Data application for the reissue of Pat. No. 10,383,158, which is a continuation of application No. 13/810,149, filed as application No. PCT/KR2011/005244 on Jul. 15, 2011, now Pat. No. 9,955,512.

(60) Provisional application No. 61/417,280, filed on Nov. 26, 2010, provisional application No. 61/392,466, filed on Oct. 12, 2010, provisional application No. 61/367,849, filed on Jul. 26, 2010, provisional application No. 61/364,793, filed on Jul. 15, 2010.

(51) Int. Cl.

| | |
|---|---|
| ***H04L 1/1829*** | (2023.01) |
| ***H04L 5/00*** | (2006.01) |
| ***H04W 72/04*** | (2023.01) |
| ***H04W 76/10*** | (2018.01) |
| *H04L 1/12* | (2006.01) |

(52) U.S. Cl.
CPC ..... *H04L 1/1861* (2013.01); *H04L 5/0007* (2013.01); *H04L 5/001* (2013.01); *H04L 5/0042* (2013.01); *H04L 5/006* (2013.01); *H04W 72/04* (2013.01); *H04L 2001/125* (2013.01)

(58) Field of Classification Search
CPC ..... H04L 1/003; H04L 1/009; H04L 1/0057; H04L 5/007; H04L 5/0044; H04L 1/188; H04L 1/1671; H04L 1/1812; H04L 1/1854; H04L 1/1887; H04L 12/2697; H04L 12/5695; H04L 43/00; H04L 43/50; H04L 43/0852; H04L 47/10; H04L 29/06; H04L 29/0809; H04L 29/06095; H04L 29/08072; H04L 29/08144; H04L 29/08171; H04L 29/08576; H04J 9/00; H04M 1/733; H04M 1/72505; H04M 1/72511; H03M 13/09; H03M 13/15; H03M 13/091; H03M 13/1515; H04N 7/50; H04N 7/2609; H04N 7/26244; H04N 7/26702; H04N 7/26707; H04W 16/10; H04W 16/14; H04W 24/00; H04W 28/04; H04W 28/16; H04W 72/02; H04W 72/04; H04W 72/042; H04W 72/04446; H04W 76/02; H04W 76/0446; H04W 80/04; H04W 88/06; H04W 88/08; H04W 84/18

See application file for complete search history.

(56) References Cited

U.S. PATENT DOCUMENTS

| | | | | |
|---|---|---|---|---|
| 2009/0316641 | A1 | 12/2009 | Yamada et al. | |
| 2010/0074246 | A1* | 3/2010 | Harada | H04W 56/0045 370/350 |
| 2010/0172428 | A1* | 7/2010 | Pani et al. | |
| 2010/0208679 | A1 | 8/2010 | Papasakellariou et al. | |
| 2010/0238886 | A1 | 9/2010 | Sambhwani et al. | |
| 2012/0113831 | A1* | 5/2012 | Pelletier | H04L 5/0053 370/252 |

FOREIGN PATENT DOCUMENTS

| | | | |
|---|---|---|---|
| WO | WO 02/082666 | A2 | 10/2002 |
| WO | WO 02/096006 | A2 | 11/2002 |
| WO | WO 02/096006 | A3 | 11/2002 |
| WO | WO 2010/121708 | A1 | 10/2010 |

OTHER PUBLICATIONS

Panasonic, "ACK/NACK multiplexing schemes on PUCCH", 3GPP TSG RAN WG1 Meeting #61bis, R1-103751, Dresden, Germany, Jun. 28-Jul. 2, 2010, pp. 1-4

Panasonic, "Support of UL ACK/NACK channel selection for carrier aggregation", 3GPP TSG RAN WG1 Meeting #60, R1-101253, San Francisco, USA, Feb. 22-26, 2010, pp. 1-6.

Samsung, "UL HARQ-ACK Multiplexing: Mapping for 4 Bits", 3GPP TSG RAN WG1 Meeting #61bis, R1-103638, Dresden, Germany, Jun. 28-Jul. 2, 2010, pp. 1-3.

Qualcomm Europe, "HS-DPCCH Design for DC-HSDPA and MIMO," 3GPP TSG-RAN WG1 #56bis, R1-091599, Seoul, South Korea, Mar. 23-27, 2009, pp. 1-21.

* cited by examiner

FIG. 6

| | | |
|---|---|---|
| $N_{RB}^{UL}-1$ | 2/2a/2b #1 (m=1) | 2/2a/2b #0 (m=0) |
| $N_{RB}^{UL}-2$ | 1/1a/1b #0 (m=3) | 1/1a/1b+2/2a/2b (m=2) |
| $N_{RB}^{UL}-3$ | 1/1a/1b #2 (m=5) | 1/1a/1b #1 (m=4) |
| $N_{RB}^{UL}-4$ | | |
| $N_{RB}^{UL}-5$ | | |
| ⋮ | ⋮ | ⋮ |
| RB 4 | | |
| RB 3 | | |
| RB 2 | 1/1a/1b #1 (m=4) | 1/1a/1b #2 (m=5) |
| RB 1 | 1/1a/1b+2/2a/2b(m=2) | 1/1a/1b #0 (m=3) |
| RB 0 | 2/2a/2b #0(m=0) | 2/2a/2b #1(m=1) |
| | Slot 0 | Slot 1 |

12 subcarriers (a)

(b)

METHOD AND APPARATUS FOR TRANSMITTING RECEPTION CONFIRMATION RESPONSE OF USER EQUIPMENT IN WIRELESS COMMUNICATION SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a *reissue continuation of Reissue application Ser. No. 17/072,554, filed on Oct. 16, 2020, which is a Reissue of U.S. Pat. No. 10,383,158 issued on Aug. 13, 2019, which is a* Continuation of U.S. patent application Ser. No. 13/810,149 filed on Jan. 14, 2013 (now U.S. Pat. No. 9,955,512 issued on Apr. 24, 2018), which was filed as the National Phase of PCT/KR2011/005244 filed on Jul. 15, 2011, which claims priority under 35 U.S.C. 119(e) to U.S. Provisional Application Nos. 61/364,793, 61/367,849, 61/392,466, and 61/417,280, filed on Jul. 15, 2010, Jul. 26, 2010, Oct. 12, 2010 and Nov. 26, 2010, respectively, all of which are hereby expressly incorporated by reference into the present application. *More than one Reissue Application has been filed for U.S. Pat. No. 1,383,158: the present application and U.S. patent application Ser. No. 17/072,554.*

BACKGROUND OF THE INVENTION

The present invention relates to wireless communication and, more particularly, to a method and apparatus in which user equipment sends a Hybrid Automatic Repeat Request (HARQ) acknowledgement (ACK)/not-acknowledgement (NACK) response, that is, an ACK/NACK response, in a wireless communication system.

A multi-carrier system has recently been in the spotlight. The multi-carrier system means a system which supports a broadband by collecting one or more Component Carriers (CCs), each having a bandwidth smaller than the broadband, that is, a target when a wireless communication system supports the broadband. That is, a plurality of component carriers can be used in a multi-carrier system. The component carrier is defined by a center frequency and a bandwidth.

A component carrier on which a base station sends a signal to a terminal is called a downlink component carrier, and a component carrier on which a terminal sends a signal to a base station is called an uplink component carrier. One uplink component carrier and one downlink component carrier correspond to one cell. Accordingly, it can be said that a terminal supplied with service using a plurality of downlink component carriers is supplied with the service from a plurality of serving cells.

In a multi-carrier system, the number of uplink control signals transmitted can be increased as compared with the existing single carrier system. For example, in a multi-carrier system, a terminal cannot receive a plurality of Transport Blocks (TBs) through a plurality of downlink component carriers. In this case, the number of uplink control signals can be increased as compared with a single carrier system because the terminal must send a Hybrid Automatic Repeat Request (HARQ) acknowledgement/non-acknowledgement (ACK/NACK), that is, an ACK/NACK response, to each of the transport blocks. Furthermore, in a multi-carrier system, there may be a limit that an uplink control signal has to be transmitted through one uplink component carrier. Accordingly, there is a need for a method that is different from a method of sending an uplink control signal in the existing single carrier system because increased uplink control signals may have to be transmitted through one uplink component carrier.

Furthermore, in a multi-carrier system, a transport block that can be transmitted through one downlink component carrier may differ according to a transmission mode. For example, only one transport block can be transmitted or a maximum of two transport blocks can be transmitted in a physical downlink shared channel (PDSCH) depending on transmission mode of a downlink component carrier. Furthermore, there may be a case where only one transport block is transmitted through a downlink component carrier set in transmission mode in which a maximum of two transport blocks can be transmitted. In this case, how a terminal will send HARQ ACK/NACK using what method may be problematic.

SUMMARY OF THE INVENTION

An object of the present invention is to provide a method and apparatus in which user equipment sends an HARQ ACK/NACK response in a wireless communication system.

A method in accordance with an aspect of the present invention provides a method in which user equipment in which two serving cells have been configured sends an HARQ ACK/NACK response. The method includes the steps of receiving a first transport block through a first serving cell set in a first transmission mode supporting up to two transport blocks; determining an HARQ ACK/NACK response comprising a first response to the first transport block; and sending the HARQ ACK/NACK response, wherein the first response is identical with a response used when the two transport blocks are received through the first serving cell.

The first response may be identical with a response when all the two transport blocks have been received and successfully decoded in the first serving cell, if the first transport block has been successfully decoded.

The first response may be identical with a response when all the two transport blocks have not been successfully decoded in the first serving cell, if the first transport block has not been successfully decoded.

The method may further include the step of receiving at least one second transport block through a second serving cell set in a second transmission mode, wherein the HARQ ACK/NACK response may include a first response to the first transport block and a second response to the at least one second transport block.

The steps of determining two uplink radio resources for the first transport block; determining at least one uplink radio resource for the at least one second transport block; selecting any one of the two uplink radio resources and the at least one uplink radio resource in response to the first response and the second response; and sending information of 2 bits in the selected one uplink radio resource may be further included.

If the first serving cell is a primary cell, the two uplink radio resources may carry resource allocation information on the first transport block and the two uplink radio resources may be determined based on radio resources used in a Physical Downlink Control Channel (PDCCH) transmitted through the first serving cell.

If the second serving cell is a secondary cell, the at least one uplink radio resource may be determined based on a radio resource value determined by a PDCCH transmitted by the second serving cell, from among four radio resource values designated according to a higher layer configuration.

The information of 2 bits may be modulated according to Quadrature Phase-Shift Keying (QPSK) and transmitted.

If the second transmission mode is transmission mode supporting up to two transport blocks and the one second transport block is received through the second serving cell and is successfully decoded, the second response may be identical with a response when all the two transport blocks have been successfully decoded in the second serving cell.

If the second transmission mode is transmission mode supporting up to two transport blocks and the one second transport block is received through the second serving cell and is not successfully decoded, the second response may be identical with a response when all the two transport blocks have not been successfully decoded in the second serving cell.

The first serving cell may be a primary cell through which the user equipment performs an initial connection establishment process or a connection re-establishment process with a base station.

The two serving cells may operate in Frequency Division Duplex (FDD).

User equipment in accordance with another aspect of the present invention includes a Radio Frequency (RF) unit for sending or receiving radio signals and a processor connected to the RF unit, wherein the processor receives a first transport block through a first serving cell set in a first transmission mode supporting up to two transport blocks, determines an HARQ ACK/NACK response comprising a first response to the first transport block, and sends the HARQ ACK/NACK response, and the first response may be identical with a response used when the two transport blocks are received through the first serving cell.

The processor may receive at least one second transport block through the second serving cell set in a second transmission mode, and the HARQ ACK/NACK response may include a first response to the first transport block and a second response to the at least one second transport block.

An HARQ ACK/NACK response can be transmitted without error even when the transmission mode of a serving cell set in UE is changed. Furthermore, an HARQ ACK/NACK response can be transmitted while reducing a possibility that an error may occur by separating points on a signal constellation to which an HARQ ACK/NACK response is mapped to a maximum extent.

BRIEF DESCRIPTION OF THE DRAWINGS

FIG. 6 shows a relationship in which PUCCH formats are physically mapped to control regions.

DETAILED DESCRIPTION OF THE INVENTION

The following technology may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA may be implemented using radio technology, such as Universal Terrestrial Radio Access (UTRA) or CDMA2000. TDMA may be implemented using radio technology, such as Global System for Mobile communications (GSM)/General Packet Radio Service (GPRS)/Enhanced Data Rates for GSM Evolution (EDGE). OFDMA may be implemented using radio technology, such as Institute of Electrical and Electronics Engineers (IEEE) 802.11 (Wi-Fi), IEEE 802.16 (WiMAX), IEEE 802.20, or Evolved UTRA (E-UTRA). IEEE 802.16m is the evolution of IEEE 802.16e, and it provides backward compatibility with systems based on IEEE 802.16e. UTRA is part of a Universal Mobile Telecommunications System (UMTS). 3$^{rd}$ Generation Partnership Project (3GPP) Long Term Evolution (LTE) is part of an Evolved UMTS (E-UMTS) using Evolved-UMTS Terrestrial Radio Access (E-UTRA), and 3GPP LTE adopts OFDMA in downlink and adopts SC-FDMA in uplink. LTE-Advance (LTE-A) is the evolution of 3GPP LTE. In order to clarify a description, IEEE 802.16m is chiefly described, but the technical spirit of the present invention is not limited thereto.

Figure 1:
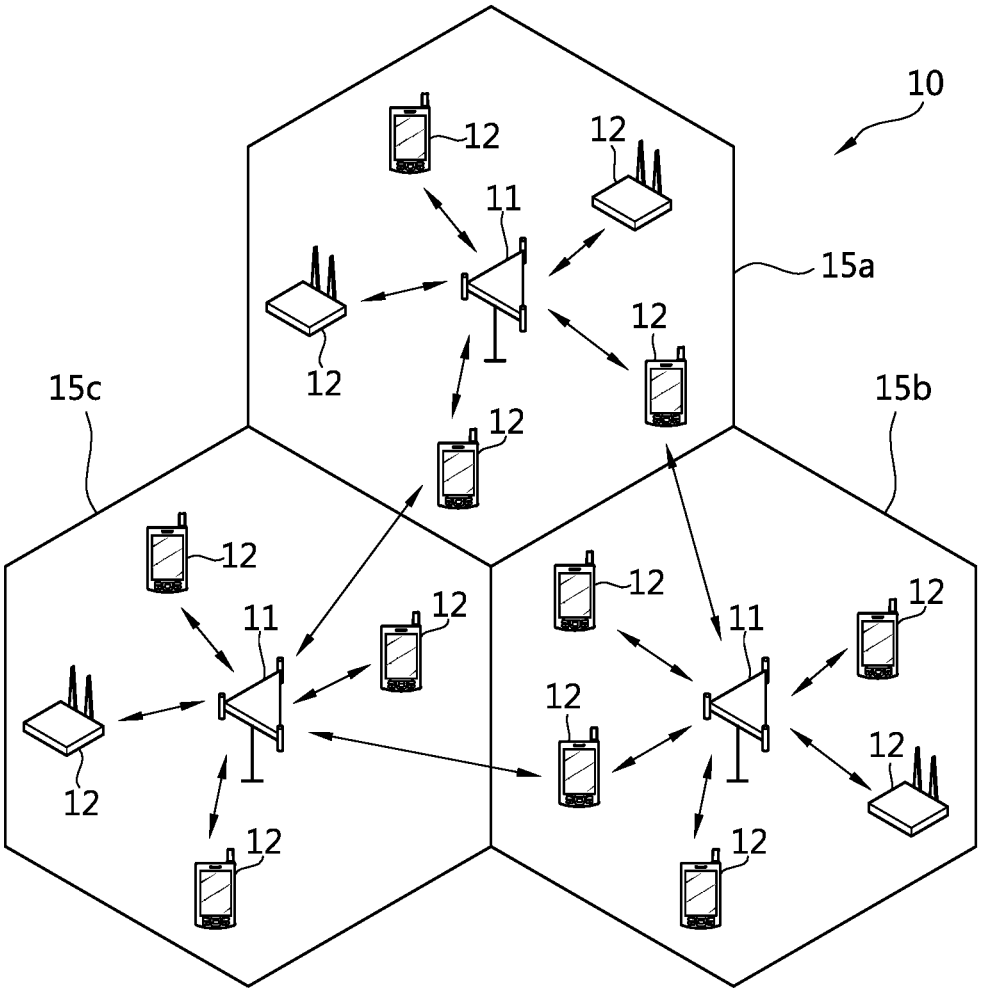
FIG. 1 shows a wireless communication system.

FIG. 1 shows a wireless communication system.

The wireless communication system 10 includes one or more Base Stations (BSs) 11. The BSs 11 provide communication services to respective geographical areas (commonly called cells) 15a, 15b, and 15c. The cell may be divided into a plurality of regions (called sectors). User Equipment (UE) 12 may be fixed or mobile and also be called another terminology, such as a Mobile Station (MS), a Mobile Terminal (MT), a User Terminal (UT), a Subscriber Station (SS), a wireless device, a Personal Digital Assistant (PDA), a wireless modem, or a handheld device. The BS 11 commonly refers to a fixed station communicating with the MSs 12, and the BS may also be called another terminology, such as an evolved NodeB (eNB), a Base Transceiver System (BTS), or an access point.

This technology can be used in downlink or uplink. In general, downlink refers to communication from the BS 11 to the UE 12, and uplink refers to communication from the UE 12 to the BS 11.

The wireless communication system may be any one of a Multiple-Input Multiple-Output (MIMO) system, a Multiple-Input Single-Output (MISO) system, a Single-Input Single-Output (SISO) system, and a Single-Input Multiple-Output (SIMO) system. An MIMO system uses a plurality of transmit antennas and a plurality of receive antennas. An MISO system uses a plurality of transmit antennas and one receive antenna. An SISO system uses one transmit antenna and one receive antenna. An SIMO system uses one transmit antenna and a plurality of receive antennas. Hereinafter, a transmit antenna means a physical or logical antenna used to send one signal or stream, and a receive antenna means a physical or logical antenna used to receive one signal or stream.

Figure 2:
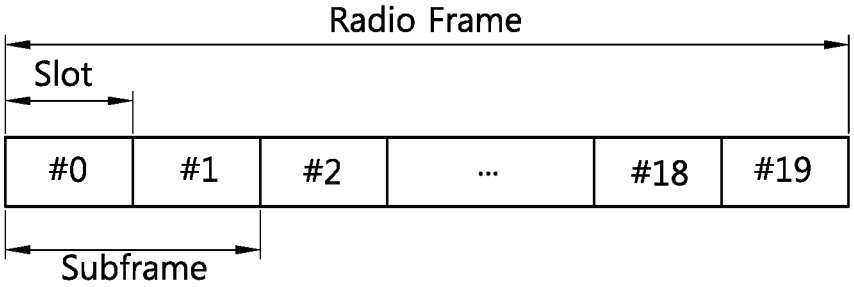
FIG. 2 shows the structure of a radio frame used in 3GPP LTE.

FIG. 2 shows the structure of a radio frame used in 3GPP LTE.

Referring to FIG. 2, the radio frame includes 10 subframes, and one subframe includes two slots. The slots within the radio frame are assigned slot numbers from #0 to #19. The time taken for one subframe to be transmitted is called a Transmission Time Interval (TTI). The TTI may be a scheduling unit for data transmission. For example, the length of one radio frame may be 10 ms, the length of one subframe may be 1 ms, and the length of one slot may be 0.5 ms.

One slot includes a plurality of Orthogonal Frequency Division Multiplexing (OFDM) symbols in the time domain and includes a plurality of subcarriers in the frequency domain. The OFDM symbol is for representing one symbol period because 3GPP LTE uses OFDMA in downlink and may be called another terminology depending on a multi-access method. For example, if SC-FDMA is used as an uplink multi-access method, the OFDM symbol may be called an SC-FDMA symbol. The structure of the radio frame is only an example. Accordingly, the number of subframes included in a radio frame, the number of slots included in a subframe, or the number of OFDM symbols included in a slot may be changed in various manners.

In 3GPP LTE, one slot is defined to include 7 OFDM symbols in a normal Cyclic Prefix (CP), and one slot is defined to include 6 OFDM symbols in an extended CP.

A wireless communication system can be basically divided into a Frequency Division Duplex (TDD) method and a Time Division Duplex (TDD) method. In accordance with the FDD method, uplink transmission and downlink transmission are performed while occupying different frequency bands. In accordance with the TDD method, uplink transmission and downlink transmission are performed at different points of time while occupying the same frequency band.

Figure 3:
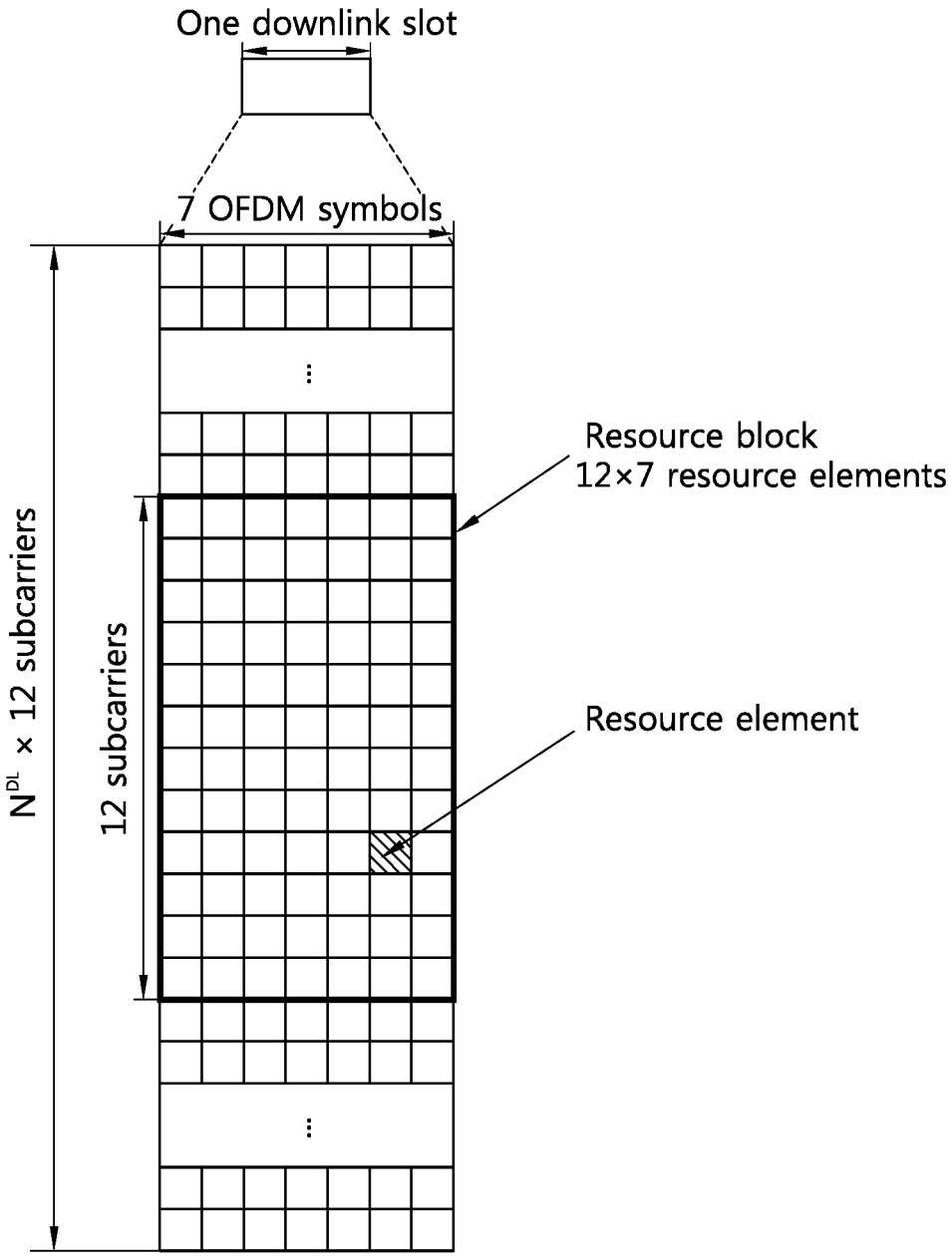
FIG. 3 shows an example of a resource grid for one downlink slot.

FIG. 3 shows an example of a resource grid for one downlink slot.

The downlink slot includes a plurality of OFDM symbols in the time domain and includes an $N_{RB}$ number of Resource Blocks (RBs) in the frequency domain. The resource block is a resource allocation unit, and the RB includes a plurality of contiguous subcarriers in one slot. The number of resource blocks $N_{RB}$ included in a downlink slot depends on a downlink transmission bandwidth configured in a cell. For example, in an LTE system, the number of resource blocks $N_{RB}$ may be any one of 60 to 110.

Each of elements on a resource grid is referred to as a Resource Element (RE). The resource element on the resource grid may be identified by an index pair (k,l) within a slot. Here, k ($k=0, \ldots, N_{RB}\times 12-1$) is a subcarrier index within the frequency domain, and l ($l=0, \ldots, 6$) is an OFDM symbol index within the time domain.

Here, one resource block is illustrated as including 7×12 resource elements, including 7 OFDM symbols in the time domain and 12 subcarriers in the frequency domain, but the number of OFDM symbols and the number of subcarriers within the resource block are not limited thereto. The number of OFDM symbols and the number of subcarriers may be changed in various manners depending on the length of a CP, frequency spacing, etc. For example, in the case of a normal CP, the number of OFDM symbols is 7, and in the case of an extended CP, the number of OFDM symbols is 6. In one OFDM symbol, one of 128, 256, 512, 1024, 1536, and 2048 may be selected and used as the number of subcarriers. The structure of an uplink slot may be the same as that of the downlink slot.

Figure 4:
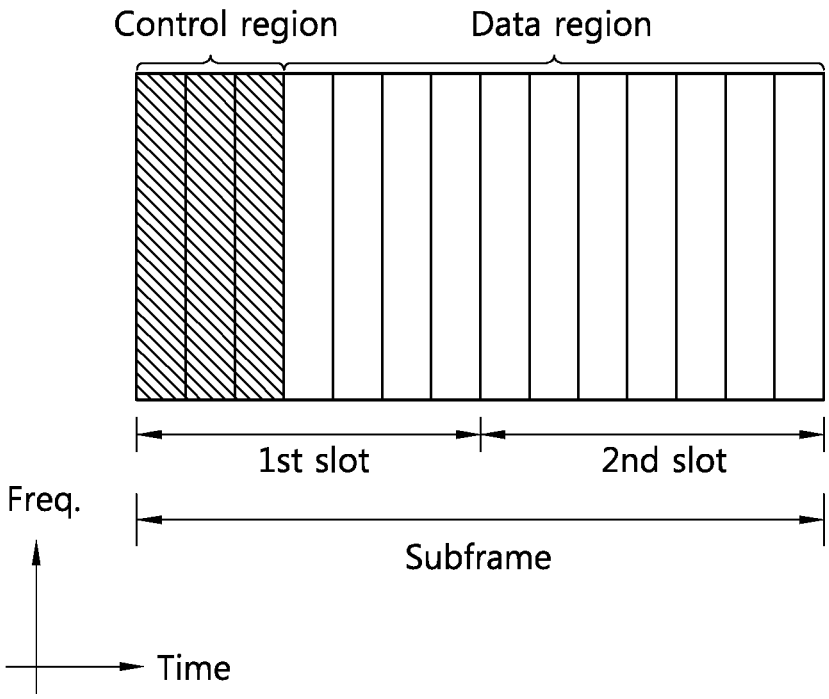
FIG. 4 shows the structure of a downlink subframe in 3GPP LTE.

FIG. 4 shows the structure of a downlink subframe in 3GPP LTE.

The downlink subframe includes 2 slots in the time domain, and each slot includes 7 OFDM symbols in a normal CP. A maximum of former 3 OFDM symbols (a maximum of 4 OFDM symbols for a 1.4 MHz bandwidth) in a first slot within a subframe become a control region to which control channels are allocated, and the remaining OFDM symbols become a data region to which data channels are allocated.

The control channel includes a PDCCH (physical downlink control channel) for example. The PDCCH can carry the resource allocation and transport format of a Downlink-Shared Channel (DL-SCH), information on the allocation of resources on an Uplink Shared Channel (UL-SCH), paging information, system information, and the resource allocation of a higher layer control message, such as a random access response transmitted on a physical downlink shared channel (PDSCH), a set of transmission power control commands for individual UE within a specific UE group, and the activation of a Voice over Internet Protocol (VoIP).

A plurality of PDCCHs can be transmitted within the control region, and an MS can monitor a plurality of PDCCHs. A PDCCH is transmitted on one Control Channel Element (CCE) or an aggregation of some contiguous CCEs. A CCE is a logical allocation unit used to provide a PDCCH with a coding rate according to the state of a radio channel. A CCE corresponds to a plurality of Resource Element Groups (REGs). The REG can include 4 Res. The format of a PDCCH and the number of bits of a possible PDCCH are determined depending on a correlation between the number of CCEs and a coding rate provided by the CCEs.

A BS determines the format of a PDCCH based on Downlink Control Information (DCI) to be transmitted to UE and attaches a Cyclic Redundancy Check (CRC) to the DCI. A unique identifier (a Radio Network Temporary Identifier (RNTI)) is masked to the CRC depending on the owner or use of the PDCCH. If the PDCCH is for specific UE, an identifier unique to the UE, for example, a Cell-RNTI (C-RNTI), can be masked to the CRC. Or, if the PDCCH is for a paging message, a paging indication identifier, that is, a Paging-RNTI (P-RNTI), can be masked to the CRC. If the PDCCH is for a System Information Block (SIB), a system information identifier, that is, a System Information-RNTI (SI-RNTI), can be masked to the CRC. A Random Access-RNTI (RA-RNTI) can be masked to the CRC in order to indicate a random access response, that is, a response to the transmission of the random access preamble of UE.

The data channel includes a PDSCH. Data, system information not transmitted through a physical broadcast channel (PBCH), a paging message, etc. are transmitted in the PDSCH. The data is transmitted for each Transport Block (TB). Each TB corresponds to a MAC layer Protocol Data Unit (PDU).

Figure 5:
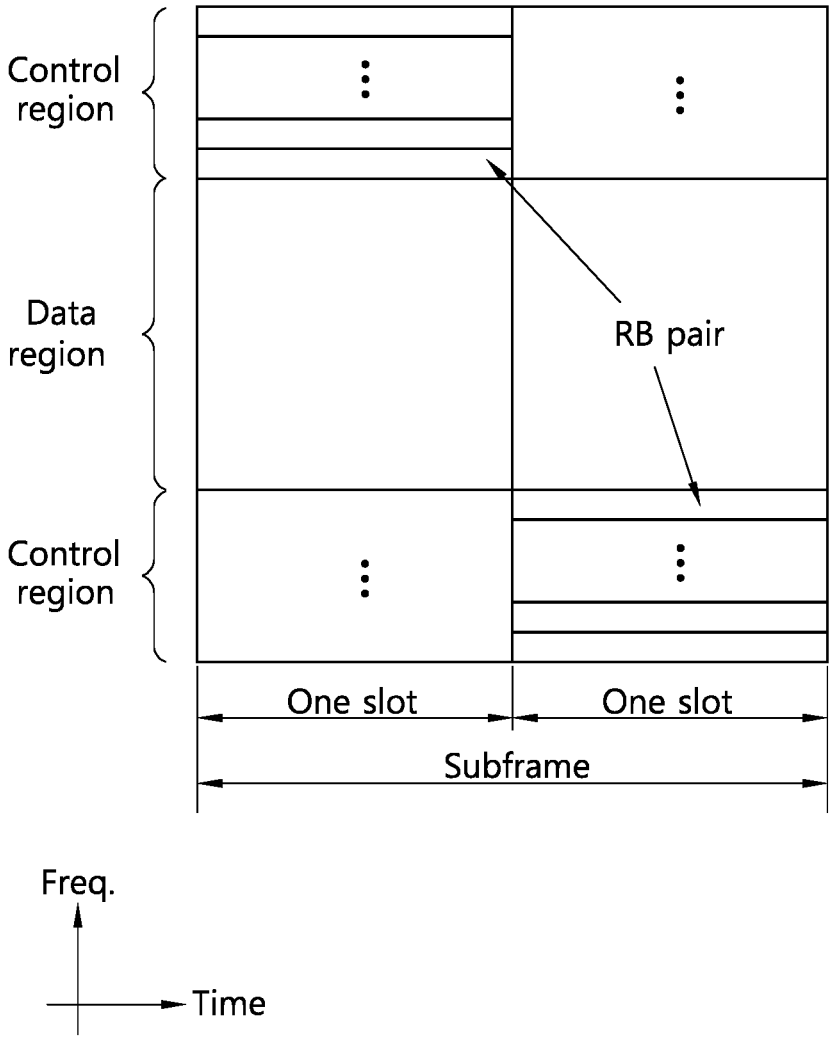
FIG. 5 shows the structure of an uplink subframe.

FIG. 5 shows the structure of an uplink subframe.

The uplink subframe can be divided into a control region and a data region in the frequency domain. A Physical Uplink Control Channel (PUCCH) on which uplink control information is transmitted is allocated to the control region. A Physical Uplink Shared Channel (PUSCH) on which data and/or uplink control information are transmitted is allocated to the data region. If this is indicated in a higher layer, UE can support the simultaneous transmission of a PUSCH and a PUCCH.

A PUSCH is mapped to an Uplink Shared Channel (UL-SCH), that is, a transport channel. Uplink data transmitted on the PUSCH can be transmitted for each transport block. The uplink data can be multiplexed data. The multiplexed data can be obtained by multiplexing the transport block for the UL-SCH and control information. The control information multiplexed into the data may include, for example, a Channel Quality Indicator (CQI), a Precoding Matrix Indicator (PMI), and a Rand Indicator (RI). Or, the uplink data may include only control information.

A PUCCH for one MS is allocated in the form of Resource Block pair (RB pair) in a subframe. Resource blocks that belong to a RB pair occupy different subcarriers in a first slot and a second slot. A frequency occupied by resource blocks that belong to a RB pair allocated to a PUCCH is changed on the basis of a slot boundary. This is said that the RB pair allocated to the PUCCH has been frequency-hopped at the slot boundary. A frequency diversity gain can be obtained when UE transmits uplink control information through different subcarriers over time.

A PUCCH carries a variety of pieces of control information depending on a format. A PUCCH format 1 carries a Scheduling Request (SR). Here, an On-Off Keying (OOK) method may be used. A PUCCH format 1a carries acknowledgement/not-acknowledgement (ACK/NACK) modulated according to a Binary Phase Shift Keying (BPSK) scheme in relation to one codeword. A PUCCH format 1b carries ACK/NACK modulated according to a Quadrature Phase Shift Keying (QPSK) scheme in relation to two codewords (transport blocks). A PUCCH format 2 carries a Channel Quality Indicator (CQI) modulated according to a QPSK scheme. PUCCH formats 2a and 2b carry a CQI and ACK/NACK.

Table 1 shows modulation schemes according to the PUCCH formats and the number of bits within a subframe.

TABLE 1

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

Table 2 shows the number of OFDM symbols used as a reference signal per slot in the PUCCH formats.

TABLE 2

| PUCCH format | Normal cyclic prefix | Extended cyclic prefix |
|---|---|---|
| 1, 1a, 1b | 3 | 2 |
| 2 | 2 | 1 |
| 2a, 2b | 2 | N/A |

TABLE 3

| | set of values for l | |
|---|---|---|
| PUCCH format | Normal cyclic prefix | Extended cyclic prefix |
| 1, 1a, 1b | 2, 3, 4 | 2, 3 |
| 2, 2a, 2b | 1, 5 | 3 |

FIG. 6 shows a relationship in which the PUCCH formats are physically mapped to control regions.

m is a position index that indicates the position of the logical frequency domain of a resource block pair allocated to a PUCCH in a subframe. The PUCCH formats 2/2a/2b are mapped to a resource block (e.g., m=0,1 in a PUCCH region) at the edge of a band and transmitted. A mixed PUCCH Resource Block (RB) may be mapped to a resource block (e.g., m=2) that is adjacent in the direction of the center of the band in the resource block to which the PUCCH formats 2/2a/2b are allocated and transmitted. The PUCCH formats 1/1a/1b in which an SR and ACK/NACK are transmitted may be disposed in a resource block where m=4 or m=5. UE may be informed of the number of resource blocks $N^{(2)}_{RB}$ used in the PUCCH formats 2/2a/2b in which a CQI is transmitted through a broadcast signal.

All the PUCCH formats use the Cyclic Shift (CS) of a sequence in each OFDM symbol. A cyclic-shifted sequence is generated by cyclic-shifting a base sequence by a specific CS amount. The specific CS amount is indicated by a CS index.

An example in which the base sequence $r_u(n)$ is defined is as follows.

$$r_u(n)=e^{jb(n)\pi/4} \quad \text{[Equation 1]}$$

In Equation 1, u is a root index, n is an element index, $0 \le n \le N-1$, and N is the length of the base sequence. b(n) is defined in section 5.5 of 3GPP TS 36.211 V8.7.0.

The length of a sequence is equal to the number of elements included in the sequence. u can be determined by a cell identifier (ID), a slot number within a radio frame, etc. When it is said that a base sequence is mapped to one resource block in the frequency domain, the length of the base sequence becomes 12 because one resource block includes 12 subcarriers. Another base sequence is defined depending on a different root index.

A cyclic-shifted sequence $r(n, I_{cs})$ can be generated by cyclic-shifting the base sequence r(n) as in Equation 2.

$$r(n, I_{cs}) = r(n) \cdot \exp\left(\frac{j2\pi I_{cs} n}{N}\right), 0 \le I_{cs} \le N-1 \quad \text{[Equation 2]}$$

In Equation 2, $I_{cs}$ is a CS index indicating a CS amount ($0 \le I_{cs} \le N-1$).

An available CS index of a base sequence refers to a CS index that can be derived from the base sequence according to a CS interval. For example, if the length of a base sequence is 12 and a CS interval is 1, the total number of available CS indices of the base sequence is 12. Or, if the length of a base sequence is 12 and a CS interval is 2, the total number of available CS indices of the base sequence is 6.

Figure 7:
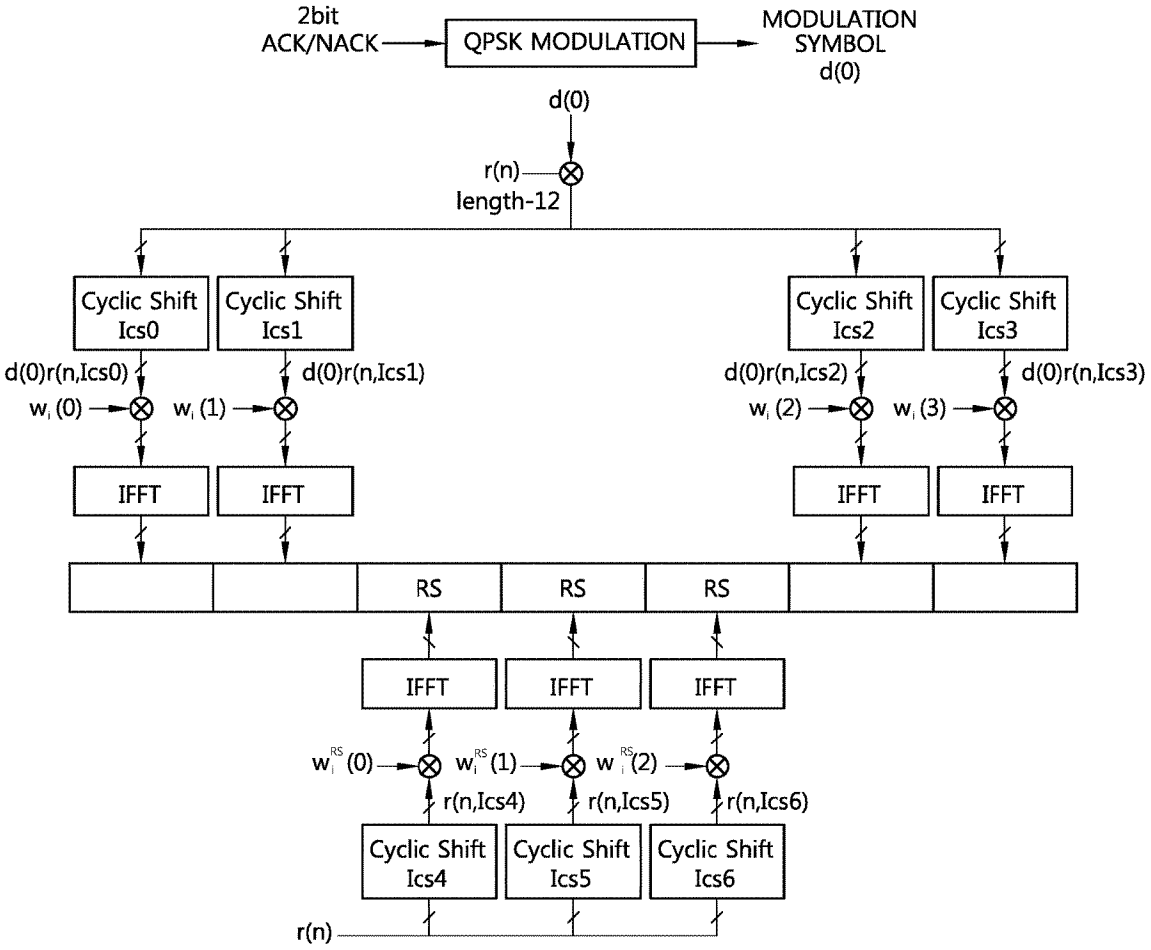
FIG. 7 shows a PUCCH format 1b in a normal CP in 3GPP LTE.

FIG. 7 shows the PUCCH format 1b in a normal CP in 3GPP LTE.

One slot includes 7 OFDM symbols, and 3 of the 7 OFDM symbols are Reference Signal (RS) OFDM symbols for a reference signal, and 4 of the 7 OFDM symbols are data OFDM symbols for an ACK/NACK signal.

In the PUCCH format 1b, an encoded 2-bit ACK/NACK signal is modulated according to Quadrature Phase Shift Keying (QPSK), thereby generating a modulation symbol d(0).

A CS index $I_{cs}$ may differ depending on a slot number $n_s$ within a radio frame and/or a symbol index l within a slot.

In a normal CP, one slot includes four data OFDM symbols for the transmission of an ACK/NACK signal. It is assumed that CS indices corresponding to the respective data OFDM symbols are $I_{cs0}$, $I_{cs1}$, $I_{cs2}$, and $I_{cs3}$.

The modulation symbol d(0) is spread in a cyclic-shifted sequence $r(n,I_{cs})$. In a slot, assuming that a one-dimensional spread sequence corresponding to an $(i+1)^{th}$ OFDM symbol is m(i), it may be represented by {m(0, m(1, m(2, m(3)}={d(0)r(n,$I_{cs0}$), d(0)r(n,$I_{cs1}$), d(0)r(n,$I_{cs2}$), d(0)r(n,$I_{cs3}$)}.

[In order to increase a UE capacity, the one-dimensional spread sequence can be spread using an orthogonal sequence. The following sequence is used as an orthogonal sequence $w_i(k)$ (i is a sequence index, $0 \le k \le K-1$), that is, a spreading factor K=4.

TABLE 4

| Index (i) | $[w_i(0), w_i(1), w_i(2), w_i(3)]$ |
|---|---|
| 0 | [+1, +1, +1, +1] |
| 1 | [+1, −1, +1, −1] |
| 2 | [+1, −1, −1, +1] |

The following sequence is used as the orthogonal sequence $w_i(k)$ (i is a sequence index, $0 \le k \le K-1$), that is, a spreading factor K=3.

TABLE 5

| Index (i) | $[w_i(0)\ w_i(1), w_i(2)]$ |
|---|---|
| 0 | [+1, +1, +1] |
| 1 | $[+1, e^{j2\pi/3}, e^{j4\pi/3}]$ |
| 2 | $[+1, e^{j4\pi/3}\ e^{j2\pi/3}]$ |

A different spreading factor can be used for each slot.

Accordingly, when a specific orthogonal sequence index i is given, a two-dimensional spread sequence {s(0), s(1), s(2), s(3)} can be represented as follows.

$$\{s(0),s(1),s(2),s(3)\}=\{w_i(0)m(0),w_i(1)m(1),w_i(2)m(2),w_i(3)m(3)\}$$

The two-dimensional spread sequences {s(0), s(1), s(2), s(3)} are subject to an Inverse Fast Fourier Transform (IFFT) and then transmitted in corresponding OFDM symbols. Likewise, an ACK/NACK signal is transmitted on a PUCCH.

The reference signal of the PUCCH format 1b is also spread in an orthogonal sequence by cyclic-shifting a base sequence r(n) and then transmitted. Assuming that CS indices corresponding to three RS OFDM symbols are $I_{cs4}$, $I_{cs5}$, and $I_{cs6}$, three cyclic-shifted sequences $r(n,I_{cs4})$, $r(n,I_{cs5})$, and $r(n,I_{cs6})$ can be obtained. The 3 cyclic-shifted sequences are spread in an orthogonal sequence $w^{RS}_i(k)$, that is, K=3.

The orthogonal sequence index i, the CS index $I_{cs}$, and the resource block index m are parameters necessary to configure a PUCCH and are also resources used to distinguish PUCCHs (or MSs) from one another. If the number of available cyclic shifts is 12 and the number of available orthogonal sequence indices is 3, PUCCHs for a total of 36 MSs can be multiplexed into one resource block.

In 3GPP LTE, in order for UE to obtain the three parameters for configuring a PUCCH, a resource index $n^{(1)}_{PUCCH}$ is defined. The resource index $n^{(1)}_{PUCCH}$ is defined as $n_{CCE}+N^{(1)}_{PUCCH}$. $n_{CCE}$ is the number of the first CCE used to send corresponding DCI (i.e., downlink resource allocation used to receive downlink data corresponding to an ACK/NACK signal), and $N^{(1)}_{PUCCH}$ is a parameter that a BS informs UE through a higher layer message.

Time, frequency, and code resources used to send the ACK/NACK signal are called ACK/NACK resources or PUCCH resources. As described above, the index of ACK/NACK resources (called an ACK/NACK resource index or a PUCCH index) necessary to send the ACK/NACK signal on the PUCCH can be represented by at least one of the orthogonal sequence index i, the CS index $I_{cs}$, the resource block index m, and a resources index for calculating the 3 indices. ACK/NACK resources may include at least one of an orthogonal sequence, a cyclic shift, a resource block, and a combination of them.

Figure 8:
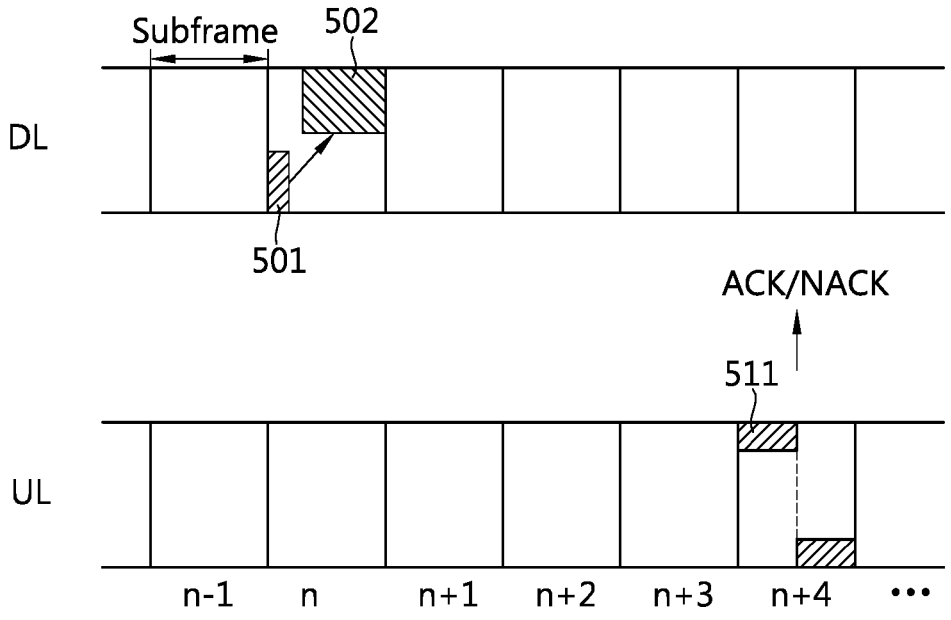
FIG. 8 shows an example of the execution of an HARQ.

FIG. 8 shows an example of the execution of an HARQ.

UE receives DL resource allocation (or called a DL grant) on a PDCCH 501 in an $n^{th}$ DL subframe by monitoring the PDCCH. The UE receives a DL Transport Block (TB) through a PDSCH 502 indicated by the DL resource allocation.

The UE sends an ACK/NACK signal for the DL transport block on a PUCCH 511 in an $(n+4)^{th}$ UL subframe. The ACK/NACK signal may be called an ACK/NACK response to the DL transport block.

If the DL transport block is successfully decoded, the ACK/NACK signal becomes an ACK signal. If the decoding of the DL transport block fails, the ACK/NACK signal becomes a NACK signal. When the NACK signal is received, a BS can perform the retransmission of the DL transport block until the ACK signal is received or up to a maximum retransmission number.

In 3GPP LTE, in order to set a resource index for the PUCCH 511, the UE uses the resource allocation of the PDCCH 501. That is, the lowest CCE index (or the index of the first CCE) used to send the PDCCH 501 becomes $n_{CCE}$, and a resource index is determined like $n^{(1)}_{PUCCH}=n_{CCE}$ $N^{(1)}_{PUCCH}$.

Figure 9:
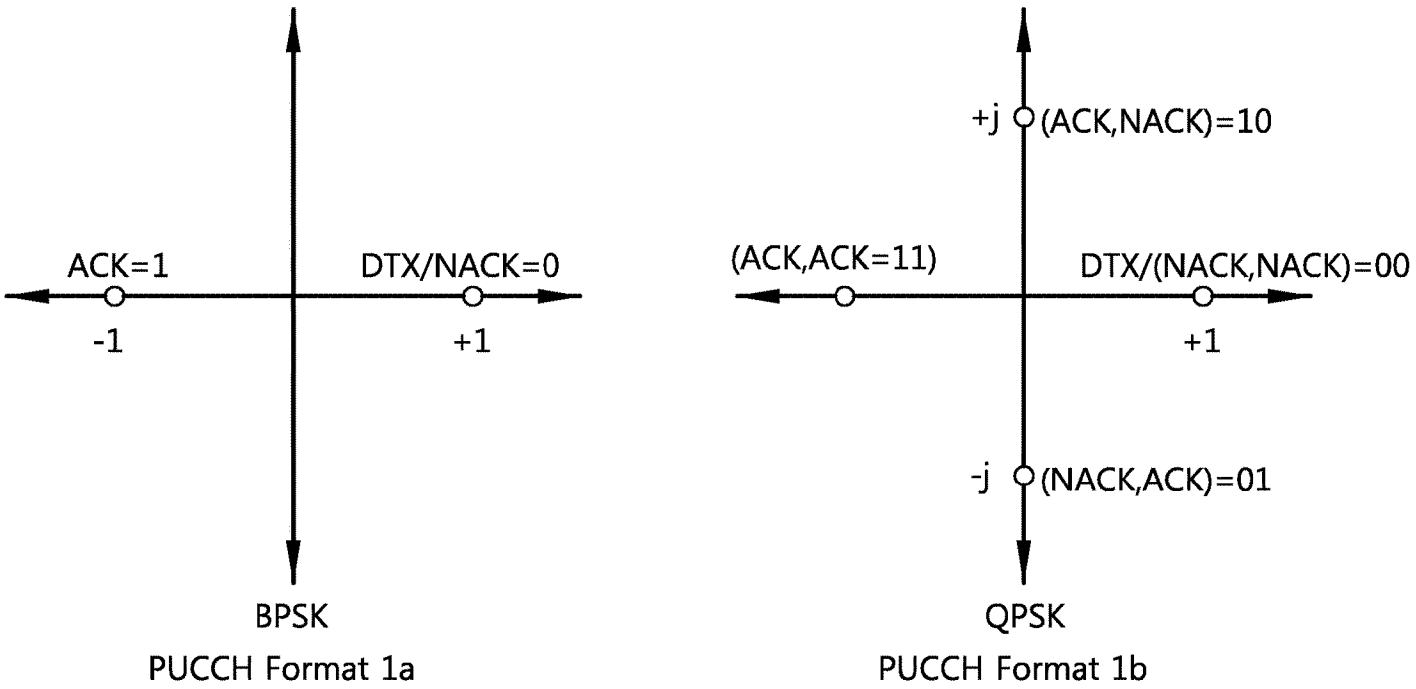
FIG. 9 shows an example of the constellation mapping of an ACK/NACK signal in PUCCH formats 1a/1b.

FIG. 9 shows an example of the constellation mapping of an ACK/NACK signal in the PUCCH formats 1a/1b.

In the PUCCH format 1a, an ACK/NACK signal of 1 bit is transmitted using Binary Phase Shift Keying (BPSK) as a modulation scheme. In BPSK, NACK is mapped to +1, and ACK is mapped to −1. In the PUCCH format 1b, an ACK/NACK signal of 2 bits is transmitted using Quadrature Phase Shift Keying (QPSK) as a modulation scheme. In QPSK, (ACK, ACK) is mapped to −1, (NACK, NACK) is mapped to +1, (ACK, NACK) is mapped to +j, and (NACK, ACK) is mapped to −j.

In discontinuous transmission (DTX) meaning that UE has failed in detecting a DL grant indicative of resource allocation in a PDCCH, both ACK and NACK are not transmitted. In this case, default NACK results in. DTX is interpreted as NACK by a BS, and DTX generates downlink retransmission.

Meanwhile, a wireless communication system may be a multi-carrier system. Here, the multi-carrier system means a system which configures a broadband by aggregating a plurality of carriers each having a small bandwidth. A 3GPP LTE system supports a case where a downlink bandwidth and an uplink bandwidth are differently set, but one carrier is a precondition in this case. In contrast, an LTE-A system may be a multi-carrier system using a plurality of Component Carriers (CCs).

A Carrier Aggregation (CA) is used in a multi-carrier system. A CA is to support a broadband by aggregating CCs having narrow bands. For example, if five CCs each having a 20 MHz bandwidth are allocated to UE, a maximum of 100 MHz bandwidth can be supported.

A CC or a CC pair can correspond to one cell. Assuming that a synchronization signal and a physical broadcast channel (PBCH) are transmitted in each CC, one downlink CC (DL CC) may be said to correspond to one cell. It may be said that UE communicating with a BS through a plurality of CCs is serviced from a plurality of serving cells.

Figure 10:
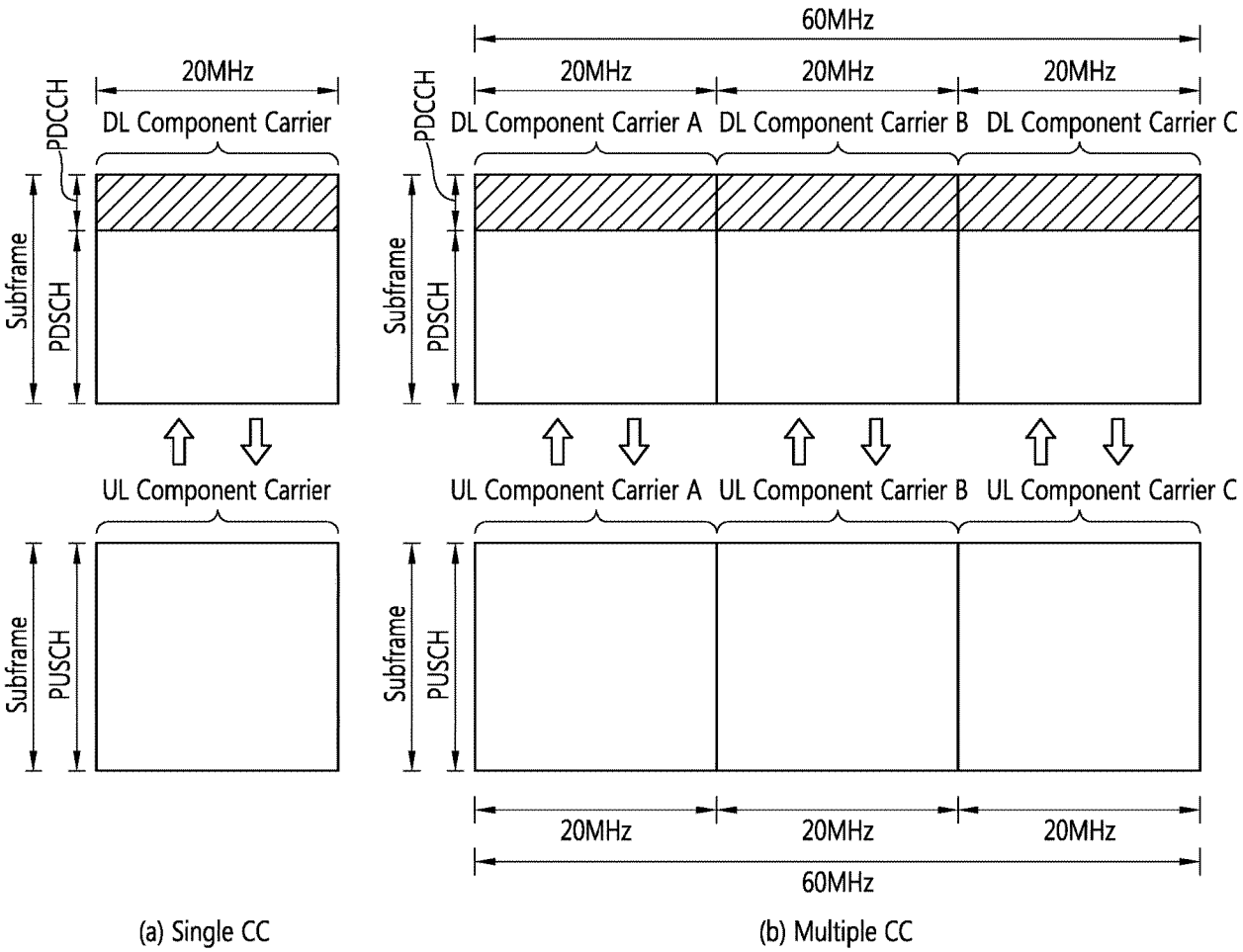
FIG. 10 shows an example of a comparison between the existing single carrier system and a multi-carrier system.

FIG. 10 shows an example of a comparison between the existing single carrier system and a multi-carrier system.

Referring to FIG. 10, in a single carrier system, only one carrier is supported for UE in uplink and downlink. A carrier may have a variety of bandwidths, but the carrier allocated to the UE has one bandwidth. In contrast, in a multi-carrier system, a plurality of CCs (DL CCs A to C and UL CCs A to C) can be allocated to UE. For example, in order to allocate a bandwidth of 60 MHz to UE, three CCs each having 20 MHz can be allocated to the UE.

The number of DL CCs and the number of UL CCs are not limited. A PDCCH and a PDSCH may be independently transmitted in respective DL CCs, and a PUCCH and a PUSCH may be independently transmitted in respective UL CCs. If the number of DL CC-UL CC pairs is defined as 3, it may be said that UE is serviced from 3 serving cells.

UE can monitor a PDCCH in a plurality of DL CCs and receive downlink transmission blocks through the plurality of DL CCs at the same time. UE can send a plurality of uplink transport blocks through a plurality of UL CCs at the same time, but may have to send HARQ ACK/NACK through only one UL CC for a downlink transmission block.

In a multi-carrier system, CC scheduling can include two methods.

In the first method, a PDCCH-PDSCH pair is transmitted in one CC. This is called self-scheduling. Furthermore, the self-scheduling means that a PUSCH is transmitted through an UL CC linked to a DL CC in which a corresponding PDCCH is transmitted. That is, the PDCCH allocates the PDSCH resources on the same CC or allocates the PUSCH resources on the linked UL CC.

In the second method, a DL CC in which a PDSCH is transmitted or an UL CC in which a PUSCH is transmitted are determined irrespective of a DL CC in which a PDCCH is transmitted. That is, the PDCCH and the PDSCH are transmitted in different DL CCs, or the PUSCH is transmitted through an UL CC not linked to the DL CC in which the PDCCH has been transmitted. This is called cross-carrier scheduling.

A CC in which the PDCCH is transmitted is called a PDCCH carrier, a monitoring carrier, or a scheduling carrier. A CC in which the PDSCH or PUSCH is transmitted is called a PDSCH or PUSCH carrier or a scheduled carrier.

In order for data to be transmitted and received through a specific cell, UE has to first complete a configuration for the specific cell. Here, the configuration means a state in which the reception of system information necessary to transmit and receive the data for the specific cell has been completed. For example, the configuration may include an overall process of receiving common physical layer parameters necessary to transmit and receive data, MAC layer parameters, or parameters necessary for a specific operation in an RRC layer. A configuration-complete cell becomes a state in which the cell can transmit and receive data immediately when the cell receives only information on which the data can be transmitted.

A cell of a configuration-complete state may be present in an activation or deactivation state. Here, activation refers to a state in which transmission or reception is being performed or a state in which transmission or reception is ready. UE can monitor or receive the control channel (PDCCH) and the data channel (PDSCH) of an activated cell in order to check resources allocated thereto (e.g., a frequency and time).

Deactivation means that the transmission or reception of traffic data is impossible and that measurement or the transmission/reception of minimum information is possible. UE can receive necessary System Information (SI) in order to receive a packet from a deactivated cell. In contrast, UE does not monitor or receive the control channel (PDCCH) and the data channel (PDSCH) of a deactivated cell in order to check resources allocated thereto (e.g., a frequency and time).

A cell may be divided into a primary cell and a secondary cell (or a serving cell).

The primary cell means a cell that operates in a primary frequency, a cell through which UE performs an initial connection establishment procedure or a connection re-establishment process with a BS, or a cell indicated as a primary cell in a handover process.

The secondary cell means a cell that operates in a secondary frequency. Once RRC connection is set up, the secondary cell is used to provide additional radio resources.

A serving cell is configured as a primary cell in the case of UE in which a CA has not been configured or UE to which a CA cannot be provided. If a CA is configured, the term 'serving cell' is used to indicate a primary cell, one of all secondary cells, or a set of a plurality of cells. A downlink CC may configure one serving cell, or a downlink CC and an uplink CC may form one serving cell through connection establishment. However, a serving cell does not include only one uplink CC.

That is, a primary cell means one serving cell that provides a security input and NAS mobility information in an RRC establishment or re-establishment state. At least one cell, together with a primary cell, may form a set of serving cells depending on the capabilities of UE. Here, at least one cell is called a secondary cell. Accordingly, a set of serving cells configured for one MS may include only one primary cell or may include one primary cell and at least one secondary cell.

A Primary Component Carrier (PCC) means a CC corresponding to a primary cell. The PCC is a CC through which UE sets up connection or RRC connection with a BS at the early stage, from among some CCs. The PCC is a CC that is responsible for connection or RRC connection for signaling regarding a plurality of CCs and that manages UE context, that is, connection information related to UE. Furthermore, the PCC is always present in an activation state when it is connected with UE and thus in RRC connected mode.

A Secondary Component Carrier (SCC) means a CC corresponding to a secondary cell. That is, the SCC is a CC allocated to UE in addition to a PCC. The SCC is a carrier that has been extended for additional resource allocation by UE in addition to a PCC and may be divided into activation and deactivation states.

A downlink CC corresponding to a primary cell is called a downlink Primary Component Carrier (DL PCC), and an uplink CC corresponding to a primary cell is called an UL PCC. Furthermore, in downlink, a CC corresponding to a secondary cell is called a DL Secondary CC (DL SCC). In uplink, a CC corresponding to a secondary cell is called an UL SCC.

A primary cell and a secondary cell have the following characteristics.

First, the primary cell is used to send a PUCCH.

Second, the primary cell is always activated, whereas the secondary cell is a carrier that is activated or deactivated depending on a specific condition.

Third, when the primary cell experiences a Radio Link Failure (hereinafter referred to as an RLF), RRC re-establishment is triggered. When the secondary cell experiences an RLF, RRC re-establishment is not triggered.

Fourth, the primary cell can be changed by a change of a security key or a handover procedure that is accompanied by a Random Access Channel (RACH) procedure.

Fifth, Non-Access Stratum (NAS) information is received through the primary cell.

Sixth, in the primary cell, a DL PCC and an UL PCC are always configured in pair.

Seventh, a different Component Carrier (CC) can be configured as a primary cell for each UE.

Eighth, procedures, such as the reconfiguration, addition, and removal of a primary cell, can be performed by an RRC layer. In adding a new secondary cell, RRC signaling may be used to send system information on a dedicated secondary cell.

The activation/deactivation of a component carrier is equal to the activation/deactivation of a serving cell. For example, assuming that a serving cell1 is composed of a DL CC1, the activation of the serving cell1 means the activation of the DL CC1. Assuming that a DL CC2 and an UL CC2 have been subject to connection established in a serving cell2, the activation of the serving cell2 means the activation of the DL CC2 and the UL CC2. In this sense each component carrier can correspond to a cell.

The number of aggregated component carriers may be differently set in downlink and uplink. A case where the number of downlink CCs is equal to the number of uplink CCs is called a symmetric aggregation, and a case where the number of downlink CCs is different from the number of uplink CCs is called an asymmetric aggregation. Furthermore, CCs may have different sizes (i.e., bandwidths). For example, assuming that 5 CCs are used to configure a 70 MHz band, the 5 CCs may be configured like a 5 MHz CC (a carrier #0)+a 20 MHz CC (a carrier #1)+a 20 MHz CC (a carrier #2)+a 20 MHz CC (a carrier #3)+a 5 MHz CC (a carrier #4).

As described above, in a multi-carrier system, unlike in a single carrier system, a plurality of Component Carriers (CCs), that is, a plurality of serving cells, can be supported. Accordingly, one MS can receive a plurality of PDSCHs through a plurality of DL CCs. Furthermore, UE can send ACK/NACK for a plurality of PDSCHs through one UL CC, for example, an UL PCC. That is, in a conventional single carrier system, a maximum of two pieces of HARQ ACK/NACK (hereinafter abbreviated as ACK/NACK, for the sake of convenience) information has only to be transmitted because only one PDSCH is received in one subframe. In a multi-carrier system, however, there is a need for an ACK/NACK transmission method because ACK/NACK for a plurality of PDSCHs can be transmitted through one UL CC.

One of methods for sending a plurality of ACK/NACKs includes channel selection. The channel selection method is a method of transmitting ACK/NACK information using radio resources used to send a signal and a constellation point according to a bit value that is transmitted in the radio resources.

Figure 11:
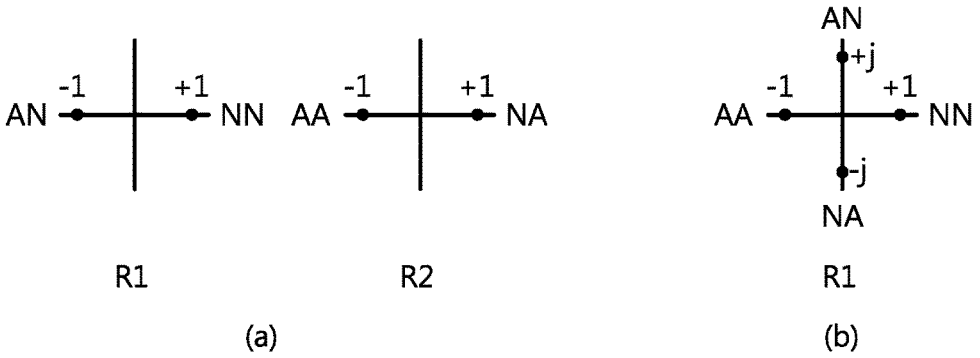
FIG. 11 shows an example of channel selection for ACK/NACK information of 2 bits.

FIG. 11 shows an example of channel selection for ACK/NACK information of 2 bits.

Referring to FIG. 11(a), R1 and R2 mean respective PUCCH resources. 2-bit ACK/NACK information is mapped to a point on the signal constellation of a modulation symbol that has been BPSK-modulated in each PUCCH resource. For example, if a point on the signal constellation of a modulation symbol corresponds to +1 in the R1 resource, it may mean (NACK, NACK). If a point on the signal constellation of a modulation symbol corresponds to −1 in the R1 resource, it may mean (ACK, NACK). If a point on the signal constellation of a modulation symbol corresponds to +1 in the R2 resource, it may mean (NACK, ACK). If a point on the signal constellation of a modulation symbol corresponds to −1 in the R2 resource, it may mean (ACK, ACK). As described above, the four states of ACK/NACK can be represented using two PUCCH resources and BPSK symbols.

Referring to FIG. 11(b), R1 means a PUCCH resource, and 2-bit ACK/NACK information may be determined depending on a point on the signal constellation of a QPSK-modulated symbol. That is, if the position of the QPSK-modulated symbol is +1, it may mean (NACK, NACK). If the position of the QPSK-modulated symbol is −1, it may mean (ACK, ACK). If the position of the QPSK-modulated symbol is +j, it may mean (ACK, NACK). If the position of the QPSK-modulated symbol is −j, it may mean (NACK, ACK).

In FIG. 11, the above-described 2-bit ACK/NACK information may be ACK/NACK for two DL CCs in which MIMO transmission is not performed in a multi-carrier system.

Channel selection for 3-bit ACK/NACK information and 4-bit ACK/NACK information is described below. The 3-bit ACK/NACK information may be ACK/NACK for one DL CC in which MIMO transmission is not performed (hereinafter referred to as a NON-MIMO DL CC) and one DL CC in which MIMO transmission is performed (hereinafter referred to as a MIMO DL CC). Or, the 3-bit ACK/NACK information may be ACK/NACK for three DL CCs in which MIMO transmission is not performed. The 4-bit ACK/NACK information may be ACK/NACK for two MIMO DL CCs, ACK/NACK for two NON-MIMO DL CCs and one MIMO DL CC, or ACK/NACK for four NON-MIMO DL CCs.

Figure 12:
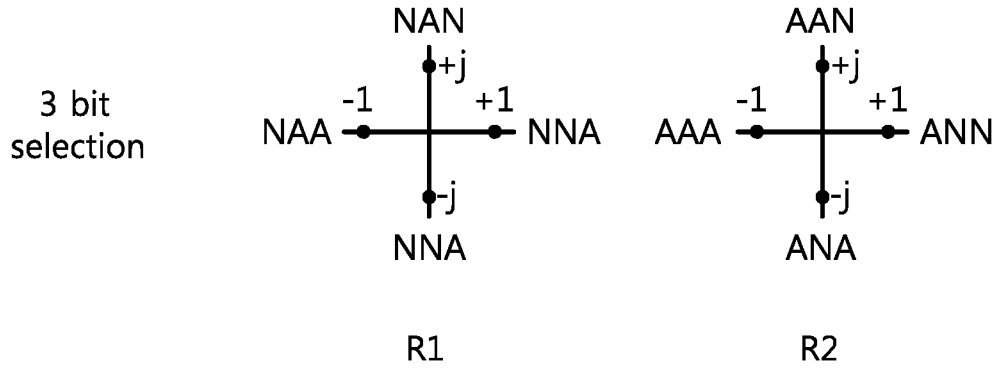
FIG. 12 illustrates channel selection for ACK/NACK information of 3 bits.

FIG. 12 illustrates channel selection for 3-bit ACK/NACK information.

Referring to FIG. 12, eight ACK/NACK information states can be represented using two PUCCH resources, such as R1 and R2, and the points of four signal constellations in the respective PUCCH resources. For example, if a point on the signal constellation of a modulation symbol corresponds to +1 in the R1 resource, it may mean (NACK, NACK, ACK). If a point on the signal constellation of a modulation symbol corresponds to −1 in the R1 resource, it may mean (NACK, ACK, ACK). If a point on the signal constellation of a modulation symbol corresponds to +j in the R1 resource, it may mean (NACK, ACK, NACK). If a point on the signal constellation of a modulation symbol corresponds to −j in the R1 resource, it may mean (NACK, NACK, ACK).

Figure 13:
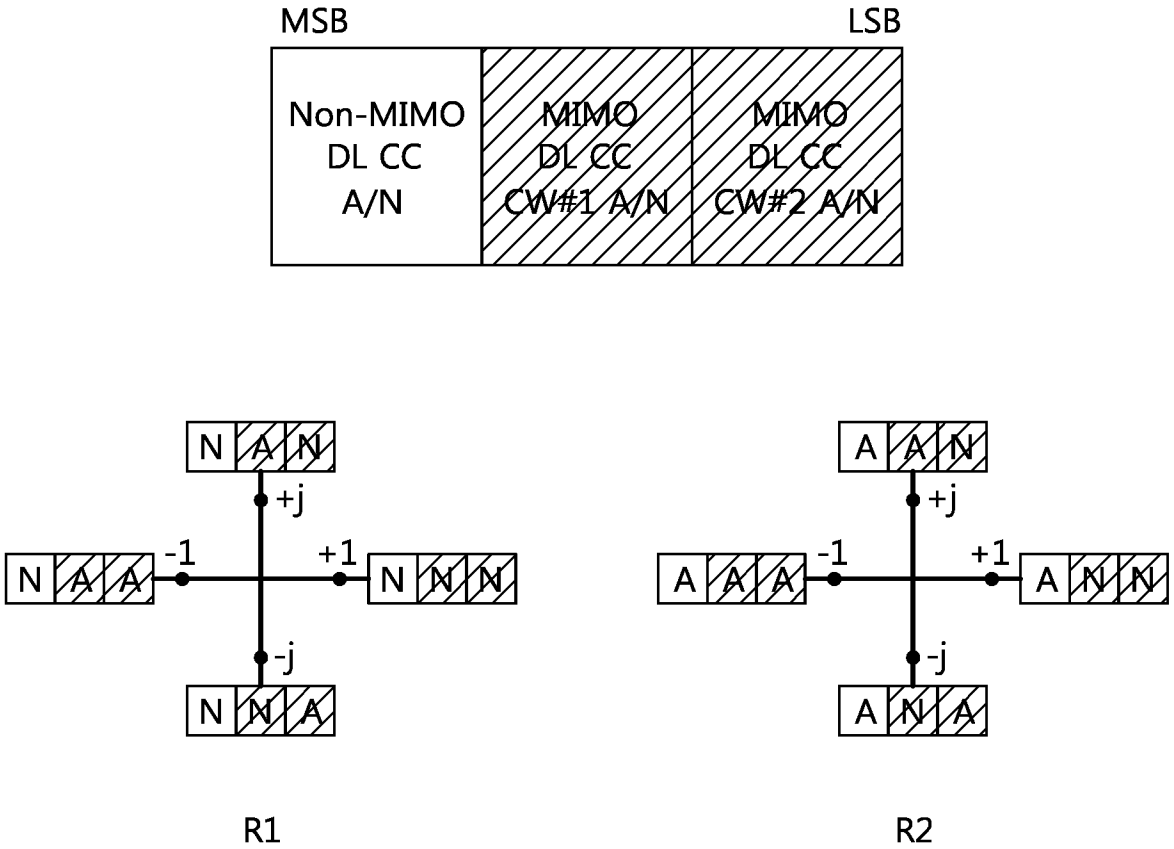
FIG. 13 is an example illustrating objects indicated by the respective bits of 3-bit ACK/NACK information and channel selection for the 3-bit ACK/NACK information.

FIG. 13 is an example illustrating objects indicated by the respective bits of 3-bit ACK/NACK information and channel selection for the 3-bit ACK/NACK information.

For example, a case where ACK/NACK for one MIMO DL CC in which UE can send one NON-MIMO DL CC and two codewords is assumed below. Here, the UE may classify the ACK/NACK for the MIMO DL CC into a point on the signal constellation of a QPSK modulation symbol and ACK/NACK for a NON-MIMO DL CC into what PUCCH resources. That is, if transmission is performed in an R1 resource, it may be classified as NACK. If transmission is performed in an R2 resource, it may be classified as ACK.

In order to use this method, the 3-bit ACK/NACK information may be mapped so that a Most Significant Bit (MSB) indicates 1-bit ACK/NACK for a NON-MIMO DL CC and 2 bits including a Least Significant Bit (LSB) indicate 2-bit ACK/NACK for an MIMO DL CC, as shown in FIG. 13.

Figure 14:
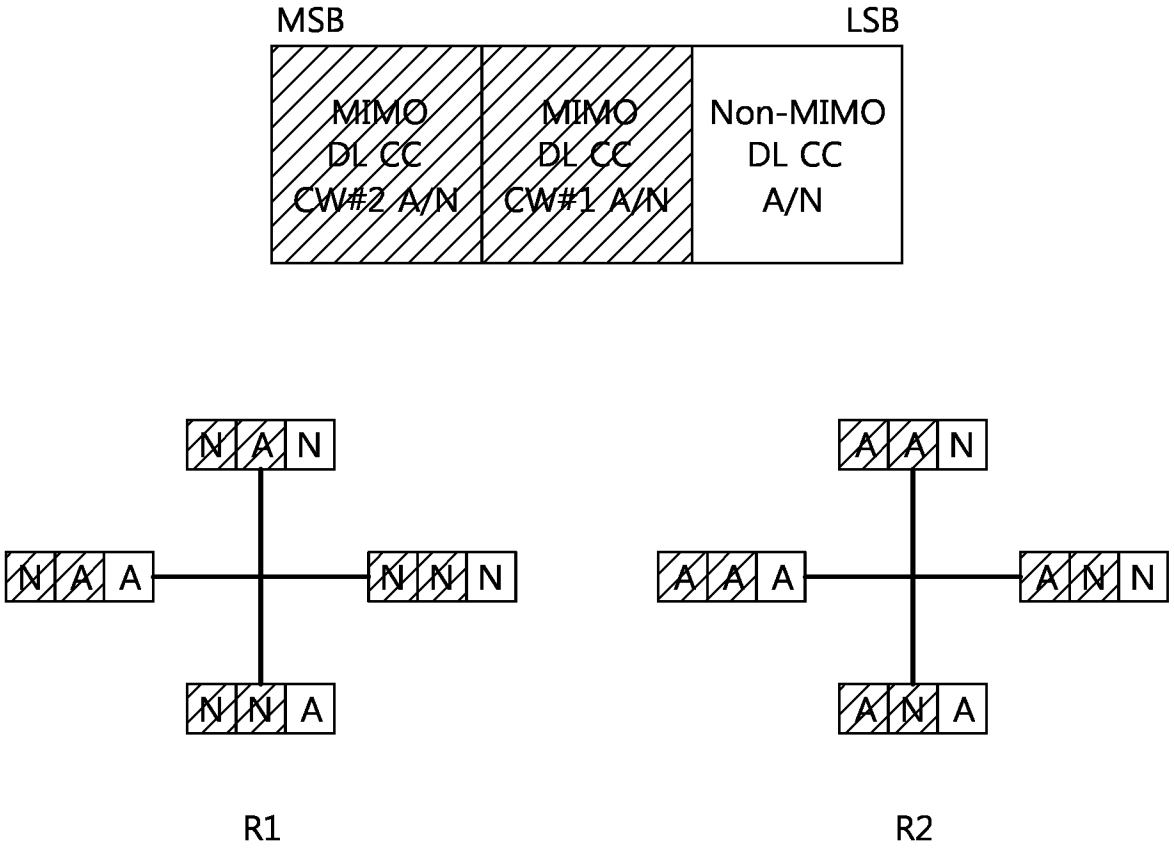
FIG. 14 is another example illustrating a mapping relationship with objects indicated by respective bits in 3-bit ACK/NACK information.

FIG. 14 is another example illustrating a mapping relationship with objects indicated by the respective bits of 3-bit ACK/NACK information. A case where ACK/NACK for one MIMO DL CC in which UE can send one NON-MIMO DL CC and two codeword is assumed below.

Referring to FIG. 14, in the 3-bit ACK/NACK information, an MSB indicates ACK/NACK for a codeword (CW) #2 for the MIMO DL CC, a next bit indicates ACK/NACK for a codeword #1 for the MIMO DL CC, and an LSB indicates ACK/NACK for the NON-MIMO DL CC. That is, if two DL CCs have been configured in UE, ACK/NACKs for one codeword (i.e., the codeword #1 of the MIMO DL CC and the codeword of the NON-MIMO DL CC) are classified into points on the signal constellation of a QPSK modulation symbol and ACK/NACK for the remaining codeword (i.e., the codeword #2 of the MIMO DL CC) is classified through a PUCCH resource, in the respective DL CCs.

Figure 15:
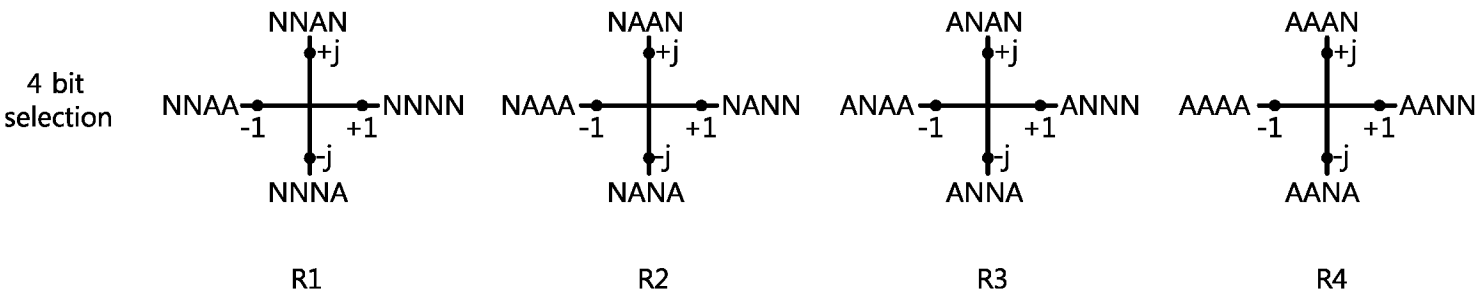
FIG. 15 illustrates channel selection for ACK/NACK information of 4 bits.

FIG. 15 illustrates channel selection for ACK/NACK information of 4 bits.

Referring to FIG. 15, R1, R2, R3, and R4 indicate four PUCCH resources. In each of the PUCCH resources, the states of 4-bit ACK/NACK information are indicated depending on four constellation points. Accordingly, a total of 16 states of ACK/NACK information can be represented.

Figure 16:
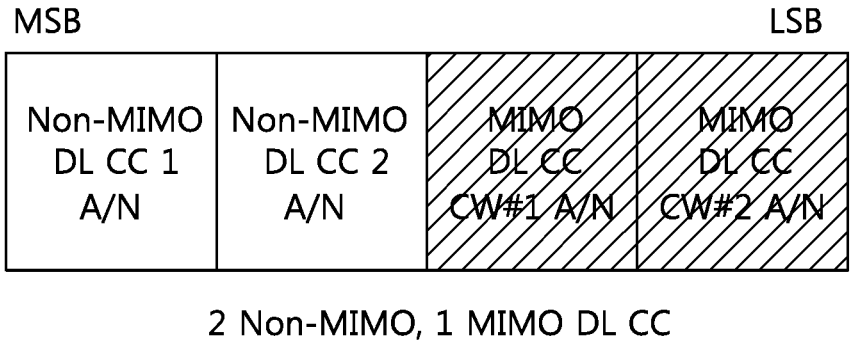
FIG. 16 shows examples illustrating a mapping relationship with objects indicated by the respective bits of 4-bit ACK/NACK information.
Figure 16:
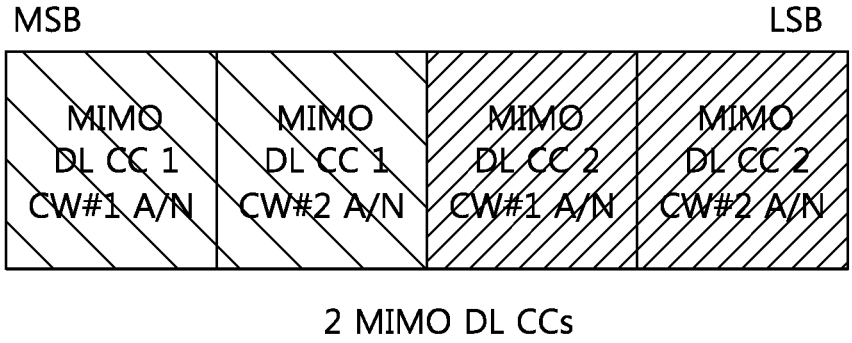

FIG. 16 shows examples illustrating a mapping relationship with objects indicated by the respective bits of 4-bit ACK/NACK information.

In FIG. 16(a), a case where two NON-MIMO DL CCs and one MIMO DL CC that supports up to codewords are configured in UE is assumed below. Here, in the 4-bit ACK/NACK information, an MSB to 2 bits may indicate ACK/NACK for the two NON-MIMO DL CCs, and an LSB to 2 bits may indicate ACK/NACK for the two codewords transmitted in the one MIMO DL CC.

In FIG. 16(b), a case where two MIMO DL CCs supporting up to two codewords have been configured in UE is assumed below. Here, in the 4-bit ACK/NACK information, an MSB to 2 bits may indicate ACK/NACK for the two codewords transmitted in any one MIMO DL CC, and an LSB to 2 bits may indicate ACK/NACK for the two codewords transmitted in the remaining MIMO DL CC.

Figure 17:
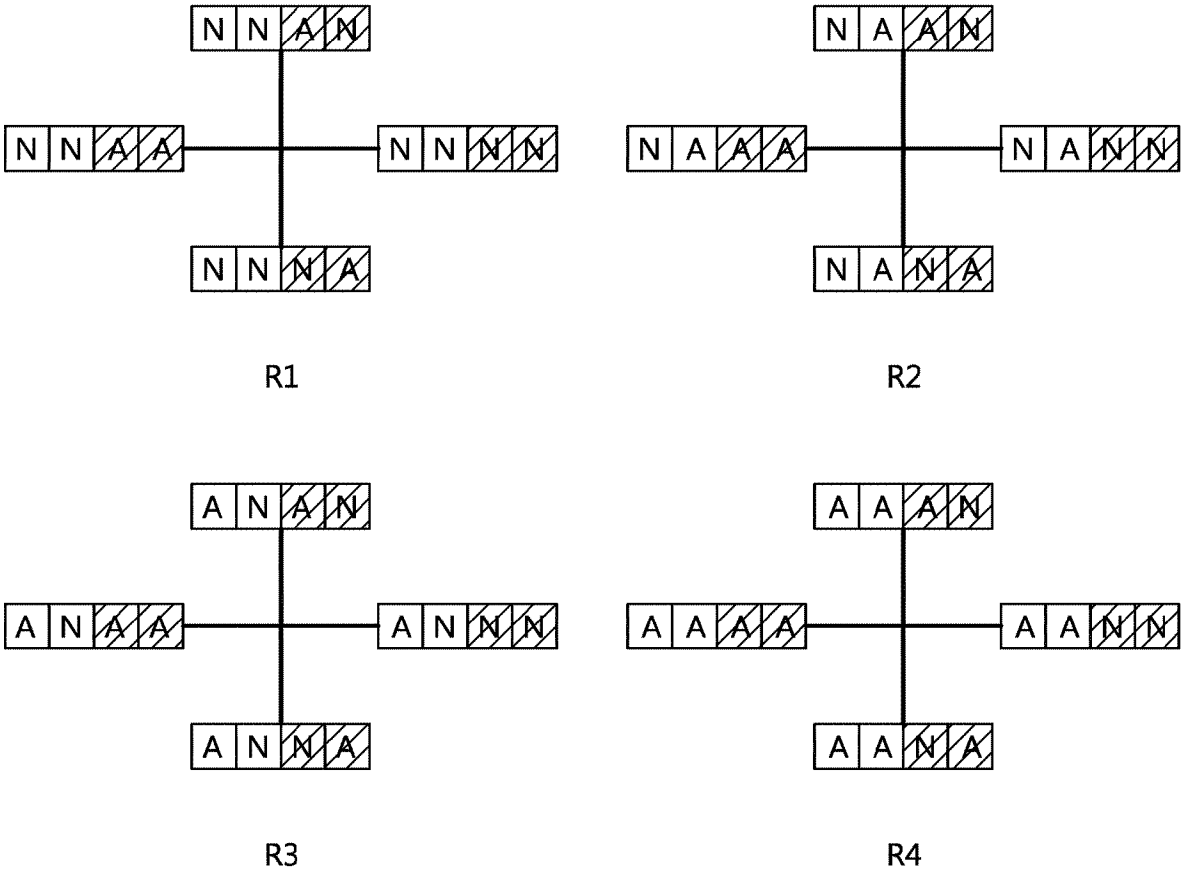
FIG. 17 shows mapping to radio resources and constellation points when 4-bit ACK/NACK information is information, such as that shown in FIG. 16.

FIG. 17 shows mapping to radio resources and constellation points when 4-bit ACK/NACK information is information, such as that shown in FIG. 16.

Referring to FIG. 17, pieces of information classified as four constellation points in PUCCH resources R1, R2, R3, and R4 are ACK/NACKs for two codewords transmitted in a MIMO DL CC. In a mapping relationship, such as that shown in FIG. 16(a), ACK/NACK for two NON-MIMO DL CCs can be known depending on whether the ACK/NACK is transmitted in what PUCCH resource. In a mapping relationship, such as that shown in FIG. 16(b), ACK/NACK for two codewords transmitted in one MIMO DL CC can be known depending on whether the ACK/NACK is transmitted in what PUCCH resource.

Figure 18:
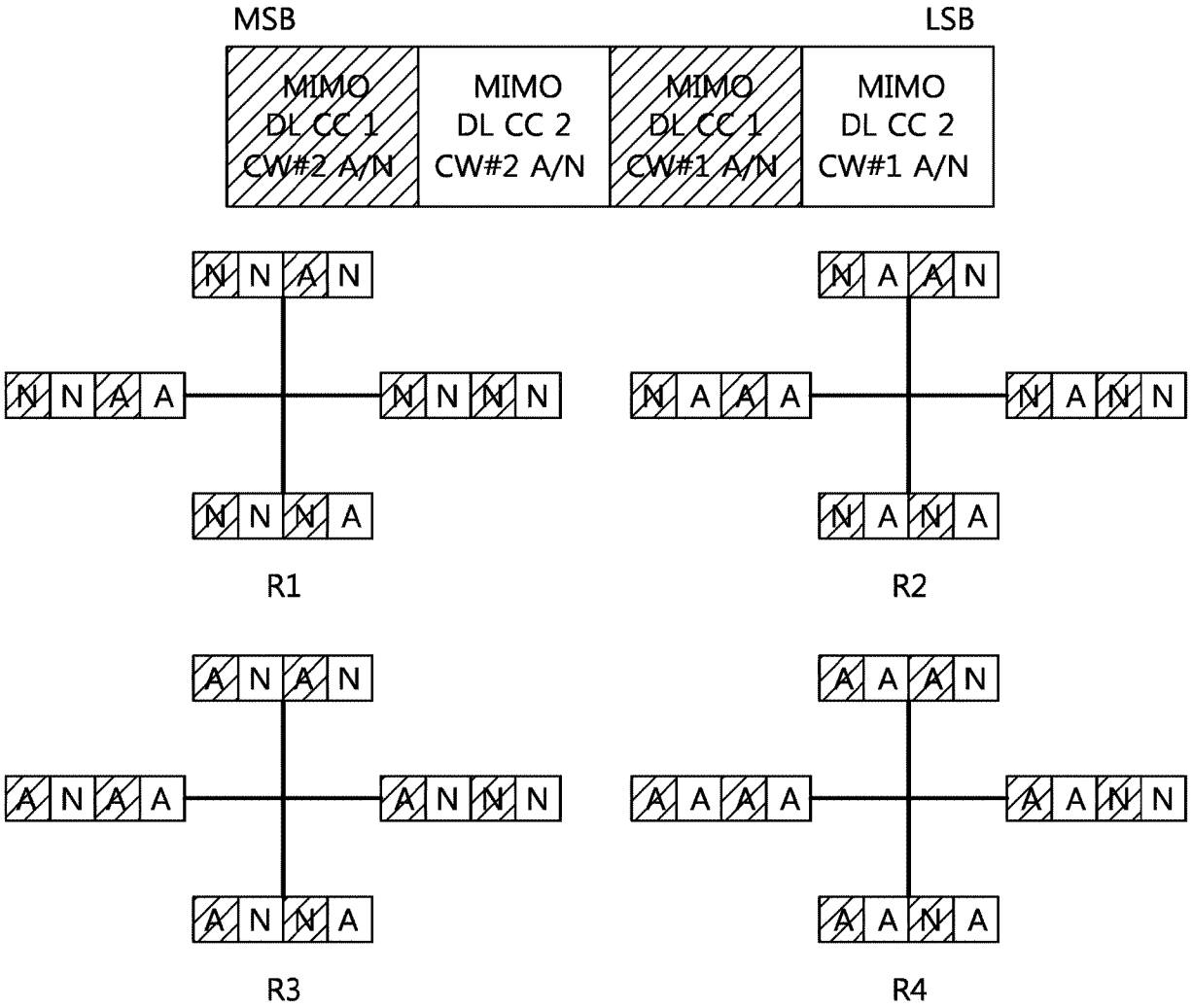
FIG. 18 is another example illustrating a mapping relationship with objects indicated by respective bits in 4-bit ACK/NACK information and mapping to radio resources and constellation points.

FIG. 18 is another example illustrating a mapping relationship with objects indicated by respective bits in 4-bit ACK/NACK information and mapping to radio resources and constellation points. A case where two MIMO DL CCs supporting up to two codewords, that is, a MIMO DL CC1 and a MIMO DL CC2, have been configured in UE is assumed below.

Referring to FIG. 18, in the 4-bit ACK/NACK information, an MSB to the codeword #2 of the MIMO DL CC 1, the codeword #2 of the MIMO DL CC 2, the codeword #1 of the MIMO DL CC 1, and the codeword #1 of the MIMO DL CC 2 can be sequentially represented.

As described above, channel selection for sending a plurality of ACK/NACKs can be implemented using a variety of methods. In a multi-carrier system, however, although a specific DL CC is set in MIMO mode, a BS can send only one codeword dynamically depending on its selection. In this case, how UE will send ACK/NACK for one codeword may be problematic.

Channel selection can be determined by the number of configured DL CCs and mode set in each DL CC (i.e., it is MIMO mode or NON-MIMO mode). If a BS changes the configuration of DL CCs, that is, the number of DL CCs or the transmission mode of the DL CCs of UE, however, a reconfiguration period for changing the configuration may be present. In the reconfiguration period, pieces of configuration information are exchanged between the BS and the UE. The BS can transfer configuration information through only a DL PCC in the reconfiguration period. In this case, if there is a difference between ACK/NACK channel selection for a DL PCC used by the UE and ACK/NACK channel selection for a DL PCC expected by the BS, a severe error may occur. Accordingly, it is preferred that a mismatch do not occur in the ACK/NACK channel selection in a process of changing or reconfiguring the configuration of the DL CCs between the BS and the UE. To this end, in ACK/NACK channel selection transmitted when UE receives a PDSCH through only a DL PCC, points on the same signal constellation as those of the PUCCH format 1a or the PUCCH format 1b are preferably used.

A method in which UE in which two DL CCs (i.e., two serving cells) have been configured sends HARQ ACK/NACK is described below. This method relates to a method of transmitting ACK/NACK when UE receives only one transport block through a DL CC in a situation that the DL CC is configured in transmission mode supporting up to two transport blocks.

Figure 19:
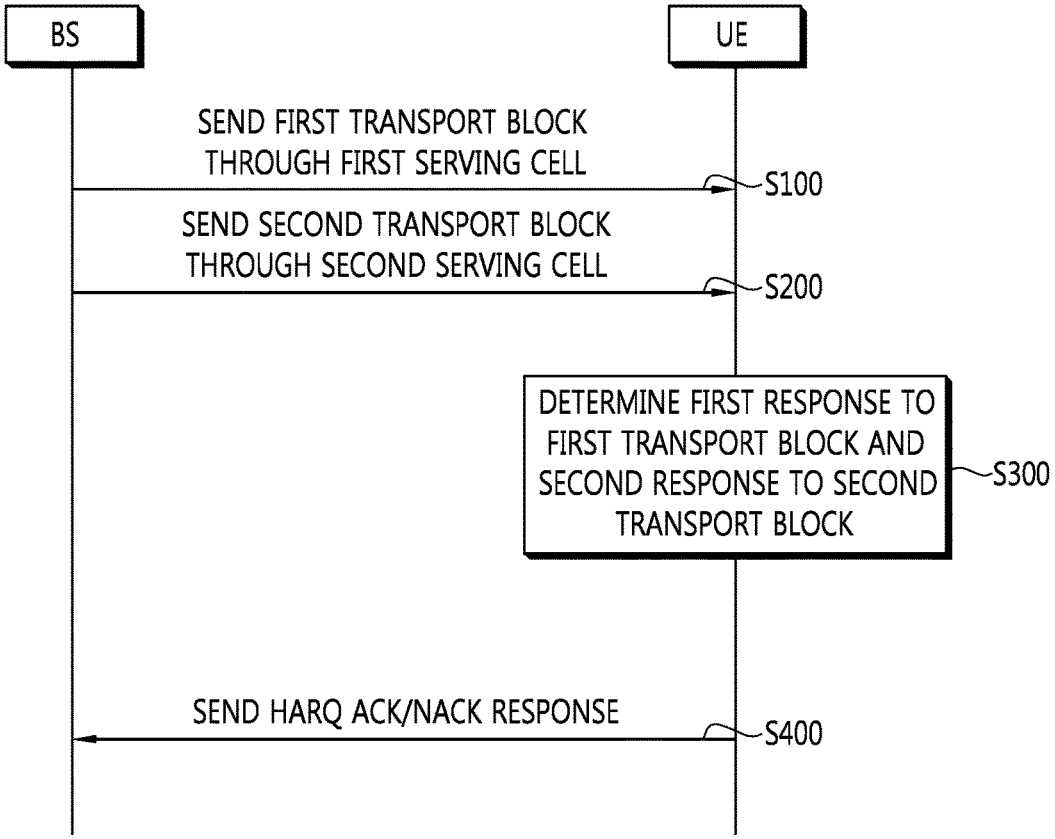
FIG. 19 is the ACK/NACK transmission method of UE in accordance with an embodiment of the present invention.

FIG. 19 is the ACK/NACK transmission method of UE in accordance with an embodiment of the present invention.

Referring to FIG. 19, the UE receives a first transport block from a BS through a first serving cell (S100) and receives a second transport block through a second serving cell (S200). Here, it is assumed that the first serving cell is set in a first transmission mode which supports up to two transport blocks. The UE determines a first response to the first transport block and a second response to the second transport block (S300) and sends an HARQ ACK/NACK response according to the first response and the second response to the BS at step S400.

Here, the first response is the same as a response in the case where the first serving cell has received all the two transport blocks and has successfully decoded the two transport blocks if the first transport block has been successfully decoded. Or, the first response is the same as a response in the case where the first serving cell has not successfully decoded all the two transport blocks if the first transport block has not been successfully decoded.

Figure 20:
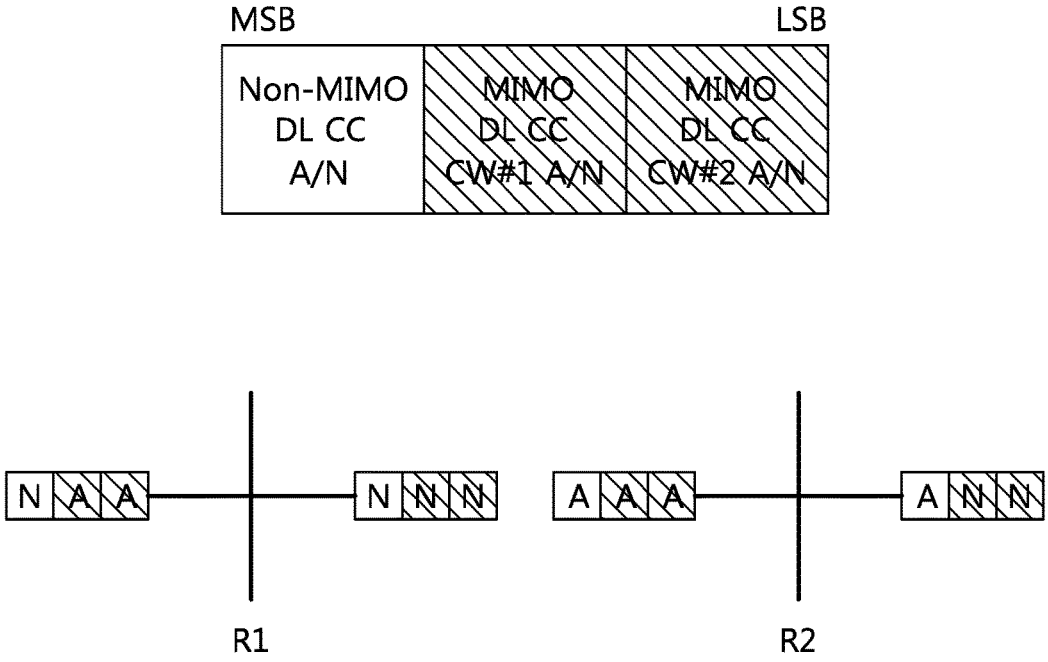
FIGS. 20 to 22 show examples in which UE uses channel selection when one transport block is received in a serving cell which supports up to two transport blocks.
Figure 21:
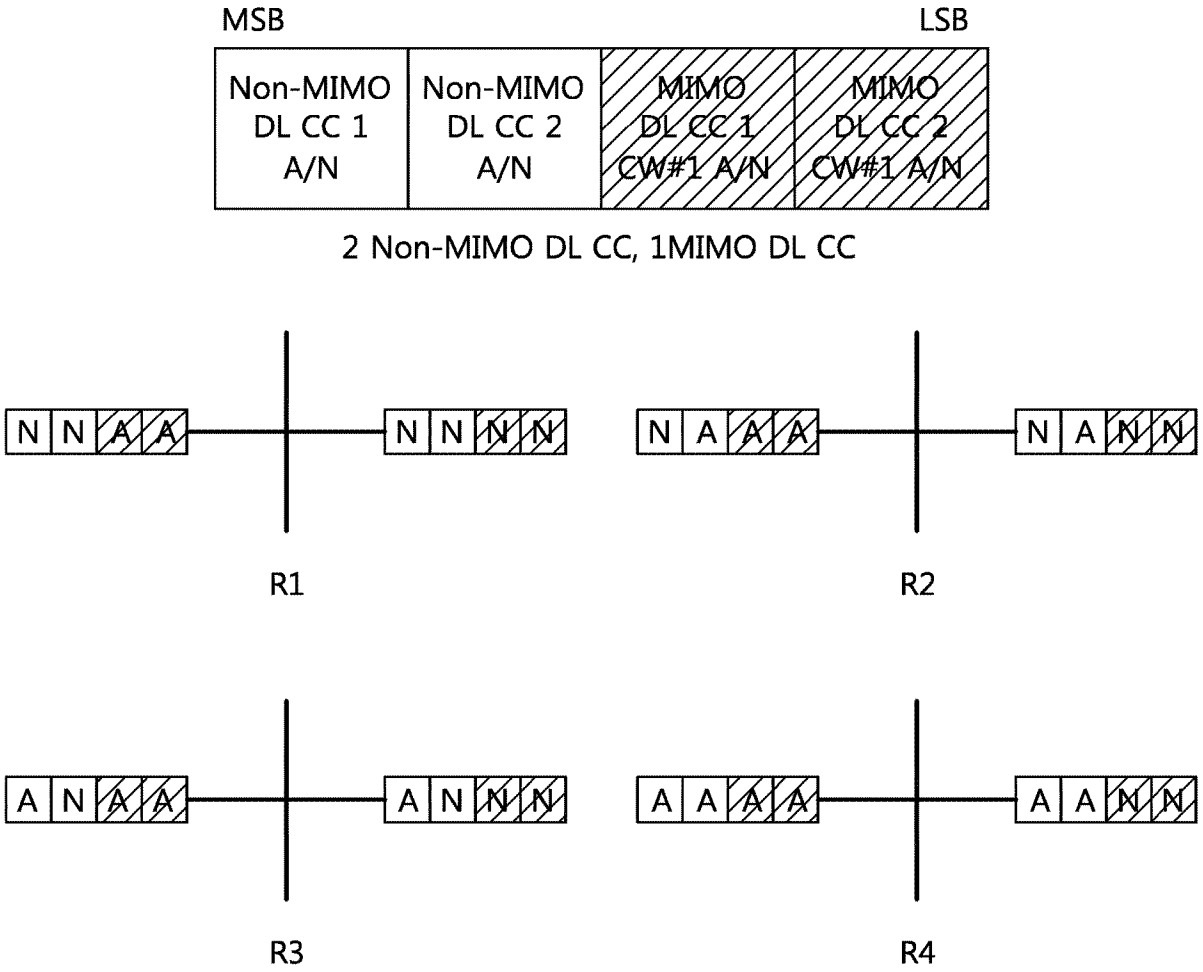
Figure 22:
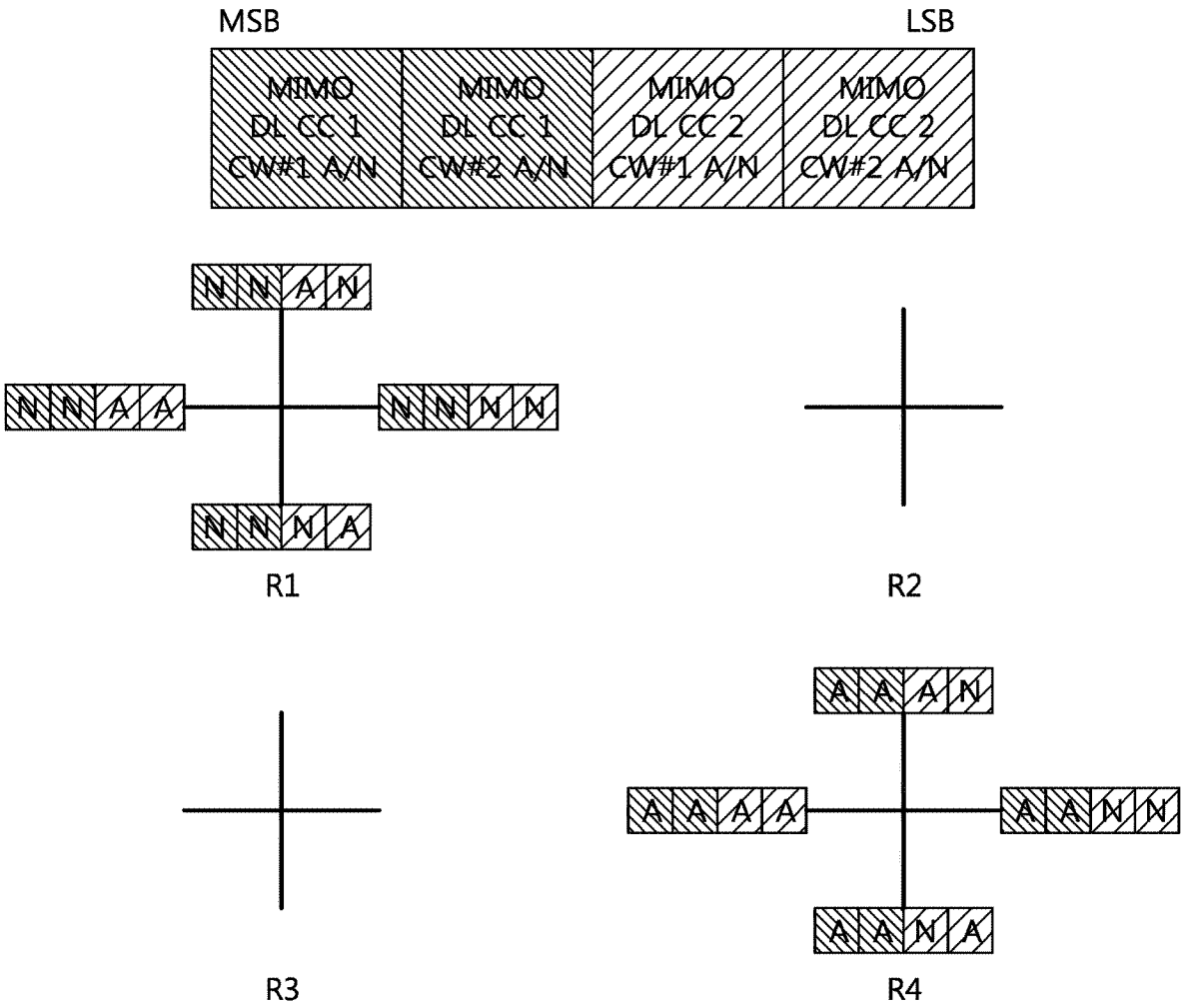

FIGS. 20 to 22 show examples in which UE uses channel selection when one transport block is received in a serving cell which supports up to two transport blocks.

FIG. 20 shows an example of channel selection when only one transport block (codeword) is received in a MIMO DL CC if one NON-MIMO DL CC and one MIMO DL CC supporting up to two codewords (transport blocks) have been configured in UE. FIG. 21 shows an example of channel selection when only one codeword (transport block) is received in a MIMO DL CC if two NON-MIMO DL CCs and one MIMO DL CC supporting up to two codewords have been configured in UE.

In FIGS. 20 and 21, when the UE receives the two transport blocks in the MIMO DL CC, ACK/NACKs for the two transport blocks are distinguished based on a point on a signal constellation in each PUCCH resource. When the UE receives only one transport block in the MIMO DL CC, if the one transport block is successfully decoded, it is mapped to a point on the same signal constellation as that of a case where both the two transport blocks have been received in the MIMO DL CC and successfully decoded. Furthermore, if the one transport block has not been successfully decoded, it is mapped to a point on the same signal constellation as that of a case where the two transport blocks have been received in the MIMO DL CC and both have not been successfully decoded. That is, the UE interprets ACK for one transport block received in the MIMO DL CC as (ACK, ACK), performs mapping, interprets NACK as (NACK, NACK), and performs mapping. Here, ACK/NACK for the codeword of a NON-MIMO DL CC is distinguished depending on the ACK/NACK is transmitted through what PUCCH resources. According to this method, the reception performance of ACK/NACK of a BS can be improved because points on the signal constellation of an ACK/NACK response are spaced apart from each other to a maximum extend, as shown in FIGS. 20 and 21.

FIG. 22 shows yet another example of channel selection when only one transport block (codeword) is received in a MIMO DL CC. A case where two MIMO DL CCs supporting up to two codewords have been configured in UE is assumed below.

If only one transport block has been received in a MIMO DL CC1 and has been successfully decoded, the UE sends an HARQ ACK/NACK response (*two ACKs for the one TB*) like in a case where all the two transport blocks have been received in the MIMO DL CC1 and have been successfully decoded. If only one transport block has been received in the MIMO DL CC1 and has not been successfully decoded, the UE sends an HARQ ACK/NACK response (*two NACKs for the one TB*) like in a case where all the two transport blocks have been received in the MIMO DL CC1 and have not been successfully decoded. Here, ACK/NACK (*two ACK/NACKs for the two TBs*) for the two transport blocks that have been received in a MIMO DL CC2 can be distinguished depending on a point on the signal constellation in each PUCCH resource. According to this method, as shown in FIG. 22, only PUCCH resources R1 and R4 can be used. That is, ACK/NACK for the MIMO DL CC1 can be transmitted using two PUCCH resources that have been spaced from each other to a maximum extent (i.e., PUCCH resources in which a difference between their resource indices is a maximum or a difference between cyclic shifts and/or orthogonal spreading codes used in resources is a maximum).

Detailed embodiments to which the above-described channel selection methods are applied are described below.

For example, in a multi-carrier system using FDD, UE can feed back ACK/NACK for two configured serving cells using the PUCCH format 1b that uses channel selection.

The UE can feed ACK/NACK for a maximum of up to two transport blocks, received in one serving cell, back to a BS by sending 2-bits (b(0)b(1) information in one PUCCH resource selected from a plurality of PUCCH resources. One codeword can be transmitted in one transport block. Signs are described in order to clarify a description. A PUCCH resource can be represented by a resource index $n^{(1)}_{PUCCH,i}$. Here, A is any one of {2, 3, 4}, and i is $0 \le i \le (A-1)$. 2-bit information is represented by b(0)b(1).

HARQ-ACK(j) indicates an HARQ ACK/NACK response related to a transport block or an SPS release PDCCH that is transmitted by a serving cell. The HARQ-ACK(j), the serving cell, and the transport block may have the following mapping relationship.

TABLE 6

| | HARQ-ACK(J) | | | |
|---|---|---|---|---|
| A | HARQ-ACK(0) | HARQ-ACK(1) | HARQ-ACK(2) | HARQ-ACK(3) |
| 2 | TRANSPORT BLOCK 1 OF PRIMARY CELL | TRANSPORT BLOCK 2 OF SECONDARY CELL | NA | NA |
| 3 | TRANSPORT BLOCK 1 OF SERVING CEL 1 | TRANSPORT BLOCK 2 OF SERVING CEL 1 | TRANSPORT BLOCK 3 OF SERVING CEL 2 | NA |
| 4 | TRANSPORT BLOCK 1 OF PRIMARY CELL | TRANSPORT BLOCK 2 OF PRIMARY CELL | TRANSPORT BLOCK 3 OF SECONDARY CELL | TRANSPORT BLOCK 4 OF SECONDARY CELL |

In Table 6, for example, in the case of A=4, HARQ-ACK (0) and HARQ-ACK(1) indicate ACK/NACKs (*two ACK/NACKs for the two TBs*) for two transport blocks transmitted by a primary cell, and HARQ-ACK(2) and HARQ-ACK(3) indicate ACK/NACKs for two transport blocks transmitted by a secondary cell.

When UE receive a PDSCH by detecting a PDCCH in the subframe (n−4) of the primary cell or detects an SPS release PDCCH, the UE sends ACK/NACK using a PUCCH resource $n^{(1)}_{PUCCH,i}$. Here, $n^{(1)}_{PUCCH,i}$ is determined as $n_{CCE,i}+N^{(1)}_{PUCCH}$. Here, $n_{CCE,i}$ means the index of the first CCE that is used for a BS to send the PDCCH, and $N^{(1)}_{PUCCH}$ is a value set through a higher layer signal. If the transmission mode of the primary cell supports up to two transport blocks, a PUCCH resources $n^{(1)}_{PUCCH,i+1}$ is given. $n^{(1)}_{PUCCH,i+1}$ can be determined as $n_{CCE,i}+1+N^{(1)}_{PUCCH}$. That is, if the primary cell is set in transmission mode in which a maximum of up to two transport blocks can be transmitted, two PUCCH resources can be determined.

If there is no PDCCH detected in the subframe (n−4) of the primary cell, the PUCCH resource $n^{(1)}_{PUCCH,i}$ for sending ACK/NACK to the PDSCH is determined by a higher layer configuration. If up to two transport blocks are supported, the PUCCH resource $n^{(1)}_{PUCCH,i+1}$ can be given as $n^{(1)}_{PUCCH,i+1}=n^{(1)}_{PUCCH,i}+1$.

If the PDCCH is detected in the subframe (n−4) and the PDSCH is received from the secondary cell, the PUCCH resources $n^{(1)}_{PUCCH,i}$ and $n^{(1)}_{PUCCH,i+1}$ for the transmission mode that supports up to two transport blocks can be determined by a higher layer configuration.

The following table shows a relationship between ACK/NACK, PUCCH resources, and 2-bit information of b(0)b(1) in the PUCCH format 1b in which channel selection is used for two PUCCH resources (when A=2).

TABLE 7

| HARQ-ACK(0) | HARQ-ACK(1) | $n_{PUCCH,i}^{(1)}$ | b(0)b(1) |
|---|---|---|---|
| ACK | ACK | $n_{PUCCH,1}^{(1)}$ | 1, 1 |
| ACK | NACK/DTX | $n_{PUCCH,0}^{(1)}$ | 1, 1 |
| NACK/DTX | ACK | $n_{PUCCH,1}^{(1)}$ | 0, 0 |
| NACK | NACK/DTX | $n_{PUCCH,0}^{(1)}$ | 0, 0 |
| DTX | NACK/DTX | No Transmission | |

The following table shows a relationship between ACK/NACK, PUCCH resources, and 2-bit information in the PUCCH format 1b in which channel selection is used for three PUCCH resources (when A=3).

TABLE 8

| HARQ-ACK(0) | HARQ-ACK(1) | HARQ-ACK(2) | $n_{PUCCH,i}^{(1)}$ | b(0)b(1) |
|---|---|---|---|---|
| ACK | ACK | ACK | $n_{PUCCH,1}^{(1)}$ | 1, 1 |
| ACK | NACK/DTX | ACK | $n_{PUCCH,1}^{(1)}$ | 1, 0 |
| NACK/DTX | ACK | ACK | $n_{PUCCH,1}^{(1)}$ | 0, 1 |
| NACK/DTX | NACK/DTX | ACK | $n_{PUCCH,2}^{(1)}$ | 1, 1 |
| ACK | ACK | NACK/DTX | $n_{PUCCH,0}^{(1)}$ | 1, 1 |
| ACK | NACK/DTX | NACK/DTX | $n_{PUCCH,0}^{(1)}$ | 1, 0 |
| NACK/DTX | ACK | NACK/DTX | $n_{PUCCH,0}^{(1)}$ | 0, 1 |
| NACK/DTX | NACK/DTX | NACK | $n_{PUCCH,2}^{(1)}$ | 0, 0 |
| NACK | NACK/DTX | DTX | $n_{PUCCH,0}^{(1)}$ | 0, 0 |
| NACK/DTX | NACK | DTX | $n_{PUCCH,0}^{(1)}$ | 0, 0 |
| DTX | DTX | DTX | No Transmission | |

If a DL PCC has been set in MIMO mode in the state in which two DL CCs DL PCC and DL SCC have been configured in UE and two codeword PDSCHs are received in the DL PCC, HARQ-ACK(0) and HARQ-ACK(1) may have to be fed back. Furthermore, if one codeword PDSCH is received in the DL PCC, the UE can determine (HARQ-ACK(0), HARQ-ACK(1)) as (ACK, ACK) or (NACK, NACK) and send them as in the following table.

TABLE 9

| HARQ-ACK(0) | HARQ-ACK(1) | HARQ-ACK(2) | $n_{PUCCH,i}^{(1)}$ | b(0)b(1) |
|---|---|---|---|---|
| ACK | ACK | NACK/DTX | $n_{PUCCH,0}^{(1)}$ | 1, 1 |
| NACK | NACK/DTX | DTX | $n_{PUCCH,0}^{(1)}$ | 0, 0 |
| NACK/DTX | NACK/DTX | ACK | $n_{PUCCH,2}^{(1)}$ | 1, 1 |
| NACK/DTX | NACK/DTX | NACK | $n_{PUCCH,2}^{(1)}$ | 0, 0 |

The following table shows a relationship between ACK/NACK, PUCCH resources, and 2-bit information in the PUCCH format 1b in which channel selection is used for four PUCCH resources (when A=4).

TABLE 10

| HARQ-ACK(0) | HARQ-ACK(1) | HARQ-ACK(2) | HARQ-ACK(3) | $n_{PUCCH,i}^{(1)}$ | b(0)b(1) |
|---|---|---|---|---|---|
| ACK | ACK | ACK | ACK | $n_{PUCCH,1}^{(1)}$ | 1, 1 |
| ACK | NACK/DTX | ACK | ACK | $n_{PUCCH,2}^{(1)}$ | 0, 1 |
| NACK/DTX | ACK | ACK | ACK | $n_{PUCCH,1}^{(1)}$ | 0, 1 |
| NACK/DTX | NACK/DTX | ACK | ACK | $n_{PUCCH,3}^{(1)}$ | 1, 1 |
| ACK | ACK | ACK | NACK/DTX | $n_{PUCCH,1}^{(1)}$ | 1, 0 |
| ACK | NACK/DTX | ACK | NACK/DTX | $n_{PUCCH,2}^{(1)}$ | 0, 0 |
| NACK/DTX | ACK | ACK | NACK/DTX | $n_{PUCCH,1}^{(1)}$ | 0, 0 |
| NACK/DTX | NACK/DTX | ACK | NACK/DTX | $n_{PUCCH,3}^{(1)}$ | 1, 0 |
| ACK | ACK | NACK/DTX | ACK | $n_{PUCCH,2}^{(1)}$ | 1, 1 |
| ACK | NACK/DTX | NACK/DTX | ACK | $n_{PUCCH,2}^{(1)}$ | 1, 0 |
| NACK/DTX | ACK | NACK/DTX | ACK | $n_{PUCCH,3}^{(1)}$ | 0, 1 |
| NACK/DTX | NACK/DTX | NACK/DTX | ACK | $n_{PUCCH,3}^{(1)}$ | 0, 0 |
| ACK | ACK | NACK/DTX | NACK/DTX | $n_{PUCCH,0}^{(1)}$ | 1, 1 |
| ACK | NACK/DTX | NACK/DTX | NACK/DTX | $n_{PUCCH,0}^{(1)}$ | 1, 0 |
| NACK/DTX | ACK | NACK/DTX | NACK/DTX | $n_{PUCCH,0}^{(1)}$ | 0, 1 |
| NACK/DTX | NACK | NACK/DTX | NACK/DTX | $n_{PUCCH,0}^{(1)}$ | 0, 0 |
| NACK | NACK/DTX | NACK/DTX | NACK/DTX | $n_{PUCCH,0}^{(1)}$ | 0, 0 |
| DTK | DTK | NACK/DTX | NACK/DTX | No Transmission | |

If a DL PCC and a DL SCC have been configured in MIMO mode in the state in which two DL CCs DL PCC and DL SCC have been configured in UE and one codeword PDSCH is received in the DL PCC or the DL SCC, the UE may send (HARQ-ACK(0), HARQ-ACK(1), HARQ-ACK (2), HARQ-ACK(3)) as in the following table.

TABLE 11

| HARQ-ACK(0) | HARQ-ACK(1) | HARQ-ACK(2) | HARQ-ACK(3) | $n_{PUCCH,i}^{(1)}$ | b(0)b(1) |
|---|---|---|---|---|---|
| ACK | ACK | NACK/DTX | NACK/DTX | $n_{PUCCH,0}^{(1)}$ | 1, 1 |
| NACK/DTX | NACK | NACK/DTX | NACK/DTX | $n_{PUCCH,0}^{(1)}$ | 0, 0 |
| ACK | ACK | ACK | ACK | $n_{PUCCH,1}^{(1)}$ | 1, 1 |
| NACK/DTX | NACK/DTX | ACK | ACK | $n_{PUCCH,3}^{(1)}$ | 1, 1 |
| ACK | ACK | ACK | NACK/DTX | $n_{PUCCH,1}^{(1)}$ | 1, 0 |
| NACK/DTX | NACK/DTX | ACK | NACK/DTX | $n_{PUCCH,3}^{(1)}$ | 1, 0 |
| ACK | ACK | NACK/DTX | ACK | $n_{PUCCH,2}^{(1)}$ | 1, 1 |
| NACK/DTX | NACK/DTX | NACK/DTX | ACK | $n_{PUCCH,3}^{(1)}$ | 0, 0 |

That is, if UE receives only one transport block from a serving cell that has been set in transmission mode supporting up to two transport blocks, the UE uses 4-bit ACK/NACK (HARQ-ACK(0), HARQ-ACK(1), HARQ-ACK(2), HARQ-ACK(3)) channel selection irrespective of the number of transport blocks actually received and uses the same HARQ ACK/NACK responses as that of a case where the two transport blocks have been received from the serving cell for the received one transport block. Here, if the decoding of the one transport block is successful, (ACK, ACK) is used (*two ACKs for the one TB*). If the decoding of the one transport block fails, (NACK, NACK) is used (*two NACKs for the one TB*).

In other words, if only a single codeword has been dynamically received in a MIMO DL CC set in MIMO mode, ACK/NACK information for the corresponding codeword may be represented as copying the ACK/NACK information of the single codeword. That is, repetitive transmission may be represented like (ACK, ACK) if ACK has to be transmitted for the single codeword and (NACK, NACK) if NACK has to be transmitted for the single codeword.

This method may be extended and applied to a case where UE receives a PDCCH in which an SPS release command is carried in a MIMO DL CC. That is, if the SPS release PDCCH is received in the MIMO DL CC, ACK is interpreted as (ACK, ACK) and NACK is interpreted as (NACK, NACK) when 1-bit ACK/NACK information is sent, and the SPS release PDCCH is carried on a 2-bit point and transmitted.

If a DL PCC is set in MIMO mode in an environment in which UE has aggregated and used two DL CCs, when two codeword PDSCHs are received in the DL PCC in order to support the existing LTE Rel-8/9 fallback function, mapping on a signal constellation of 2-bit ACK/NACK may be mapping, such as that of the PUCCH format 1b of Rel-8. Furthermore, when one codeword PDSCH is received in the DL PCC set in MIMO mode, mapping on a signal constellation of 1-bit ACK/NACK for the one codeword PDSCH may have the same mapping as that of the PUCCH format 1a of Rel-8 (ACK for one codeword PDSCH is mapped to (ACK, ACK) for two codeword PDSCHs and NACK for one codeword PDSCH is mapped to (NACK, NACK) for two codeword PDSCHs). In this case, Rel-8 fallback can be performed irrespective of whether the PDSCH received in the DL PCC is a single codeword or two codewords.

Figure 23:
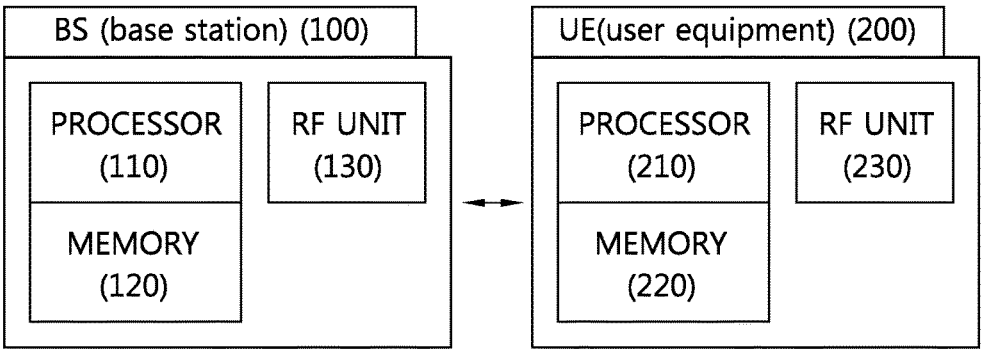
FIG. 23 is a block diagram showing a BS and UE in which an embodiment of the present invention is implemented.

FIG. 23 is a block diagram showing a BS and UE in which an embodiment of the present invention is implemented.

A BS 100 includes a processor 110, memory 120, and a Radio Frequency (RF) unit 130. The processor 110 implements the proposed functions, processes and/or methods. For example, the processor 110 configures serving cells in UE and provides configuration information on the transmission mode of each serving cell. Furthermore, the processor 110 sends a transport block to UE through the serving cell and receives HARQ ACK/NACK feedback. The layers of a radio interface protocol can be implemented by the processor 110. The memory 120 is connected to the processor 110, and the memory 120 stores a variety of pieces of information for driving the processor 110. The RF unit 130 is connected to the processor 110, and the RF unit 130 sends and/or receives radio signals.

The UE 200 includes a processor 210, memory 220, and an RF unit 230. The processor 210 implements the proposed functions, processes and/or methods. The layers of a radio interface protocol can be implemented by the processor 210. The processor 210 receives a first transport block through a first serving cell set in a first transmission mode that supports up to two transport blocks and receives at least one second transport block through a second serving cell set in a second transmission mode. Next, the processor 210 determines an HARQ ACK/NACK response, including a first response to the first transport block and a second response to the at least one second transport block, and sends the HARQ ACK/NACK response to a BS. Here, the first response included in the HARQ ACK/NACK response is identical with a response used when two transport blocks are received through the first serving cell. For example, if the first transport block is successfully decoded, (ACK, ACK) is transmitted like in a case where the two transport blocks have been successfully decoded in the first serving cell. If the decoding of the first transport block fails, (NACK, NACK) is transmitted like in a case where both the two transport blocks have not been successfully decoded in the first serving cell. The memory 220 is connected to the processor 210, and the memory 220 stores a variety of pieces of information for driving the processor 210. The RF unit 230 is connected to the processor 210, and the RF unit 230 sends and/or receives radio signals and sends the spread complex modulation symbols to a BS.

The processor 110, 210 may include Application-Specific Integrated Circuits (ASICs), other chipsets, logic circuits and/or data processors. The memory 120, 220 may include Read-Only Memory (ROM), Random Access Memory (RAM), flash memory, memory cards, storage media and/or other storage devices. The RF unit 130, 230 may include a baseband circuit for processing radio signals. When the embodiment is implemented in software, the above-described scheme may be implemented into a module (process or function) that performs the above function. The module may be stored in the memory 120, 220 and executed by the processor 110, 210. The memory 120, 220 may be placed inside or outside the processor 110, 210 and connected to the processor 110, 210 using a variety of well-known means. In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and other steps may be included or one or more steps of the flowcharts may be deleted without affecting the scope of the present invention.

The above embodiments include various aspects of examples. Although all possible combinations for describing the various aspects may not be described, those skilled in the art may appreciate that other combinations are possible. Accordingly, the present invention should be construed as including all other replacements, modifications, and changes which fall within the scope of the claims.

What is claimed is:

[1. A method for transmitting acknowledgement/negative-acknowledgement (ACK/NACK) information of a user equipment (UE) configured with two serving cells including a first serving cell and a second serving cell, the method comprising:

receiving two transport blocks (TBs) through a downlink subframe of the first serving cell;

receiving one TB through a downlink subframe of the second serving cell; and transmitting ACK/NACK information informing ACK/NACKs for the two TBs and the one TB through an uplink subframe of the first serving cell, wherein the ACK/NACK information informs the ACK/NACKs for the two TBs and the one TB by a combination of one resource selected from a plurality of candidate resources and two bits transmitted through the one resource, and wherein:

when the UE is configured with a transmission mode that supports up to two TBs on the second serving cell, if the one TB is decoded successfully, the UE transmits first ACK/NACK information informing 'two ACK/NACKs for the two TBs' and 'two ACKs for the one TB' by a first combination of a first resource among the plurality of candidate resources and two bits, wherein the first resource is selected based on the 'two ACK/NACKs for the two TBs' and 'two ACKs for the one TB', or if the one TB is not decoded successfully, the UE transmits second ACK/NACK information informing 'two ACK/NACKs for the two TBs' and 'two NACKs for the one TB' by a second combination of a second resource among the plurality of candidate resources and two bits, wherein the second resource is selected based on the 'two ACK/NACKs for the two TBs' and 'two NACKs for the one TB'.]

[2. The method of claim 1, wherein the first serving cell is a primary cell.]

[3. The method of claim 1, wherein the second serving cell is a secondary cell.]

[4. The method of claim 1, wherein the two bits transmitted through the one resource are modulated by quadrature phase shift keying (QPSK).]

[5. The method of claim 1, wherein the ACK/NACK indicates ACK, NACK or discontinuous transmission (DTX).]

[6. A user equipment (UE), comprising:

a transceiver configured to receive and transmit radio signals; and a processor connected to the transceiver, wherein the processor is configured to:

control the transceiver to receive two transport blocks (TBs) through a downlink subframe of the first serving cell;

control the transceiver to receive one TB through a downlink subframe of the second serving cell; and control the transceiver to transmit ACK/NACK information informing ACK/NACKs for the two TBs and the one TB through an uplink subframe of the first serving cell, wherein the ACK/NACK information informs the ACK/NACKs for the two TBs and the one TB by a combination of one resource selected from a plurality of candidate resources and two bits transmitted through the one resource, and wherein:

when the UE is configured with a transmission mode that supports up to two TBs on the second serving cell, if the one TB is decoded successfully, the UE transmits first ACK/NACK information informing 'two ACK/NACKs for the two TBs' and 'two ACKs for the one TB' by a first combination of a first resource among the plurality of candidate resources and two bits, wherein the first resource is selected based on the 'two ACK/NACKs for the two TBs' and 'two ACKs for the one TB', or if the one TB is not decoded successfully, the UE transmits second ACK/NACK information informing 'two ACK/NACKs for the two TBs' and 'two NACKs for the one TB' by a second combination of a second resource among the plurality of candidate resources and two bits, wherein the second resource is selected based on the 'two ACK/NACKs for the two TBs' and 'two NACKs for the one TB'.]

[7. The UE of claim 6, wherein the first serving cell is a primary cell.]

[8. The UE of claim 6, wherein the second serving cell is a secondary cell.]

[9. The UE of claim 6, wherein the two bits transmitted through the one resource are modulated by quadrature phase shift keying (QPSK).]

[10. The UE of claim 6, wherein the ACK/NACK indicates ACK, NACK or discontinuous transmission (DTX).]

*11. A method for transmitting acknowledgement/negative-acknowledgement (ACK/NACK) information of a user equipment (UE) configured with two serving cells including a first serving cell and a second serving cell, the method comprising:*

*receiving, in a subframe for a downlink, two transport blocks (TBs) associated with the first serving cell;*

*receiving, in a subframe for the downlink, one TB associated with the second serving cell; and*

*transmitting ACK/NACK information for the two TBs and the one TB on a physical uplink control channel (PUCCH) resource,*

*wherein the ACK/NACK information informs ACK/NACKs for the two TBs and the one TB based on the PUCCH resource selected from a plurality of candidate PUCCH resources and two bits transmitted through the PUCCH resource,*

*wherein the UE is configured with a transmission mode that supports up to two TBs on the second serving cell, and*

*wherein:*

*based on the one TB being decoded successfully, the UE transmits first ACK/NACK information informing 'two ACK/NACKs for the two TBs' and 'two ACKs for the one TB' based on a first PUCCH resource among the plurality of candidate PUCCH resources and two bits, wherein the first PUCCH resource is selected based on the 'two ACKs for the one TB', and*

*based on the one TB being not decoded successfully, the UE transmits second ACK/NACK information informing 'two ACK/NACKs for the two TBs' and 'two NACKs for the one TB' based on a second PUCCH resource among the plurality of candidate PUCCH resources and two bits, wherein the second PUCCH resource is selected based on the 'two NACKs for the one TB'.*

*12. A user equipment (UE), comprising:*

*a transceiver configured to receive and transmit radio signals; and a processor connected to the transceiver,*

*wherein the processor is adapted to:*

*control the transceiver to receive, in a subframe for a downlink two transport blocks (TBs) associated with a first serving cell;*

*control the transceiver to receive, in a subframe for the downlink one TB associated with a second serving cell; and*

*control the transceiver to transmit acknowledgement/negative-acknowledgement (ACK/NACK) information for the two TBs and the one TB on a physical uplink control channel (PUCCH) resource,*

*wherein the ACK/NACK information informs ACK/NACKs for the two TBs and the one TB based on the PUCCH resource selected from a plurality of candidate PUCCH resources and two bits transmitted through the PUCCH resource,*

*wherein the UE is configured with a transmission mode that supports up to two TBs on the second serving cell, and*

*wherein:*

*based on the one TB being decoded successfully, the UE transmits first ACK/NACK information informing 'two ACK/NACKs for the two TBs' and 'two ACKs for the one TB' based on a first PUCCH resource among the plurality of candidate PUCCH resources and two bits, wherein the first PUCCH resource is selected based on the 'two ACKs for the one TB', and*

*based on the one TB being not decoded successfully, the UE transmits second ACK/NACK information informing 'two ACK/NACKs for the two TBs' and 'two NACKs for the one TB' based on a second PUCCH resource among the plurality of candidate PUCCH resources and two bits, wherein the second PUCCH resource is selected based on the 'two NACKs for the one TB'.*

*13. The method of claim 11, wherein the first PUCCH resource is selected based on the 'two ACK/NACKs for the two TBs' and 'two ACKs for the one TB'.*

*14. The method of claim 11, wherein the second PUCCH resource is selected based on the 'two ACK/NACKs for the two TBs' and 'two NACKs for the one TB'.*

*15. A method for receiving acknowledgement/negative-acknowledgement (ACK/NACK) information from a user equipment (UE) configured with two serving cells including a first serving cell and a second serving cell, the method performed by a base station and comprising:*

*transmitting, in a subframe for a downlink, two transport blocks (TBs) associated with the first serving cell to the UE;*

*transmitting, in a subframe for the downlink, one TB associated with the second serving cell to the UE which is configured with a transmission mode that supports up to two TBs on the second serving cell; and*

*receiving ACK/NACK information for the two TBs and the one TB on a physical uplink control channel (PUCCH) resource from the UE,*

*wherein the ACK/NACK information informs ACK/NACKs for the two TBs and the one TB based on the PUCCH resource and two bits received on the PUCCH resource,*

*wherein the ACK/NACK information is first ACK/NACK information based on the PUCCH resource being a first PUCCH resource among a plurality of candidate PUCCH resources and two bits received on the first PUCCH resource, the first ACK/NACK information informing 'two ACK/NACKs for the two TBs' and 'two ACKs for the one TB', and*

*wherein the ACK/NACK information is second ACK/NACK information based on the PUCCH resource being a second PUCCH resource among the plurality of candidate PUCCH resources and two bits received on the second PUCCH resource, the second ACK/NACK information informing 'two ACK/NACKs for the two TBs' and 'two NACKs for the one TB'.*

*16. A base station (BS), comprising:*

*a transceiver configured to receive and transmit radio signals; and*

*a processor connected to the transceiver,*

*wherein the processor is adapted to:*

*transmit, in a subframe for a downlink, two transport blocks (TBs) associated with the first serving cell to a user equipment (UE);*

*transmit, in a subframe for the downlink, one TB associated with the second serving cell to the UE which is configured with a transmission mode that supports up to two TBs on the second serving cell; and*

*receive ACK/NACK information for the two TBs and the one TB on a physical uplink control channel (PUCCH) resource from the UE,*

*wherein the ACK/NACK information informs ACK/NACKs for the two TBs and the one TB based on the PUCCH resource and two bits received on the PUCCH resource,*

*wherein the ACK/NACK information is first ACK/NACK information based on the PUCCH resource being a first PUCCH resource among a plurality of candidate PUCCH resources and two bits received on the first PUCCH resource, the first ACK/NACK information informing 'two ACK/NACKs for the two TBs' and 'two ACKs for the one TB', and*

*wherein the ACK/NACK information is second ACK/NACK information based on the PUCCH resource being a second PUCCH resource among the plurality of candidate PUCCH resources and two bits received on the second PUCCH resource, the second ACK/NACK information informing 'two ACK/NACKs for the two TBs' and 'two NACKs for the one TB'.*

* * * * *